US007343265B2

(12) United States Patent
Andarawis et al.

(10) Patent No.: US 7,343,265 B2
(45) Date of Patent: Mar. 11, 2008

(54) SYSTEM TO MONITOR THE HEALTH OF A STRUCTURE, SENSOR NODES, PROGRAM PRODUCT, AND RELATED METHODS

(75) Inventors: Emad Andarawis Andarawis, Ballston Lake, NY (US); Ertugrul Berkcan, Clifton Park, NY (US); Eladio Clemente Delgado, Burnt Hills, NY (US); Samantha Rao, Ann Arbor, MI (US)

(73) Assignee: Lockheed Martin Corporation, Bethesda, MD (US)

( * ) Notice: Subject to any disclaimer, the term of this patent is extended or adjusted under 35 U.S.C. 154(b) by 109 days.

(21) Appl. No.: 11/286,792

(22) Filed: Nov. 23, 2005

(65) Prior Publication Data

US 2007/0118335 A1 May 24, 2007

(51) Int. Cl.
*G06F 19/00* (2006.01)
(52) U.S. Cl. .......................... 702/188; 702/34; 702/35; 702/187; 340/505
(58) Field of Classification Search ................ 702/188, 702/34
See application file for complete search history.

(56) References Cited

U.S. PATENT DOCUMENTS

| 5,440,300 | A |  | 8/1995 | Spillman, Jr. ............. 340/10.34 |
| 5,969,260 | A |  | 10/1999 | Belk et al. ..................... 73/773 |
| 5,970,393 | A |  | 10/1999 | Khorrami et al. ........... 455/129 |
| 6,941,202 | B2 | * | 9/2005 | Wilson et al. ................ 701/29 |
| 7,103,460 | B1 | * | 9/2006 | Breed ........................... 701/29 |
| 7,103,507 | B2 | * | 9/2006 | Gorinevsky et al. ........ 702/184 |
| 7,196,637 | B2 | * | 3/2007 | Sabet et al. .................. 340/933 |
| 2002/0050925 | A1 |  | 5/2002 | Arms et al. ................. 340/505 |
| 2003/0234730 | A1 | * | 12/2003 | Arms et al. ............ 340/870.01 |
| 2005/0007239 | A1 | * | 1/2005 | Woodard et al. ........... 340/10.2 |
| 2005/0088299 | A1 | * | 4/2005 | Bandy et al. .......... 340/539.16 |
| 2005/0204825 | A1 | * | 9/2005 | Kunerth et al. ............... 73/786 |
| 2006/0106550 | A1 | * | 5/2006 | Morin et al. .................. 702/34 |
| 2006/0232382 | A1 | * | 10/2006 | Bauer et al. ............... 340/10.1 |

* cited by examiner

*Primary Examiner*—Hal Wachsman
(74) *Attorney, Agent, or Firm*—Bracewell & Giuliani LLP

(57) ABSTRACT

A system to monitor the health of a structure, health monitoring sensor nodes, program product, and associated methods are provided. The system includes an array of health monitoring sensor nodes connected to or embedded within a structure to monitor the health of the structure. Each health monitoring sensor node includes sensor elements positioned to sense parameters of the structure and to provide data related to the parameters to a health monitoring sensor node interrogator. Each health monitoring sensor node has a tunable antenna arrangement individually tunable to minimize data collisions between each other of the health monitoring sensor nodes. Each health monitoring sensor node also includes a processor and memory in communication with the processor storing a parameter processing program product adapted to control tuning the antenna arrangement and providing data to the health monitoring sensor node interrogator.

31 Claims, 12 Drawing Sheets

SYSTEM TO MONITOR THE HEALTH OF A STRUCTURE, SENSOR NODES, PROGRAM PRODUCT, AND RELATED METHODS

RELATED APPLICATIONS

This invention is related to Non-Provisional application Ser. No. 11/287,009 by Berkcan, et al., titled "System to Monitor the Health of a Structure, Sensor Nodes, Program Product, and Related Methods," filed on Nov. 23, 2005; and Non-Provisional application Ser. No. 11/286,795, by Andarawis, et al., titled "System to Monitor the Health of a Structure, Sensor Nodes, Program Product, and Related Methods," filed on Nov. 23, 2005, all incorporated by reference herein in their entirety.

BACKGROUND OF THE INVENTION

1. Field of the Invention

The present invention relates generally to multi-node sensor systems. More specifically, the present invention relates to a system, sensor nodes, program product, and related methods to monitor the health of structural components and to minimize data collisions between nodes.

2. Description of the Related Art

Various types of platforms such as, for example, aircraft structural components, aircraft skins, or other related components, when in operation are subjected to various environmental conditions such as stress and strain, exposure to temperature extremes, and/or significant vibration energy. Due to the various environmental conditions such components can suffer material degradation over time.

Structural health monitoring helps promote realization of the full potential of such components. Remotely position sensors (sensor units or nodes) have been installed adjacent to such structures/components to monitor various parameters such as, for example, strain levels, stress, temperature, pressure, or vibration level to help manage physical inspection schedules, maintenance schedules, to help predict material failure, and generally monitor the "health" of such components. Such sensors have been provided a dedicated power supply such as power obtained through conductors, e.g., wires, connected to the aircraft electrical system or through chemical batteries. Such wiring can undesirably result in increased weight and complexity of the component being monitored and/or of the associated structure or component and are subject to damage or breakage requiring extensive repair costs and down time. Depending upon available space, batteries can be inappropriate due to their size. Batteries can also have a limited service life and therefore typically require periodic inspection and/or replacement, are often positioned in locations difficult to reach, and often require costly disassembly and reassembly of the sensor or component to perform service on the battery. Further, batteries may not be suitable due to environmental constraints, i.e., temperature changes often affect battery performance.

Some more recent structural health monitoring systems include fiber-optic sensors connected to a network of fiber-optic conductors to form an interrogation system. Such fiber-optic conductors, as with electrical conductors, can significantly raise the complexity of the component and/or deployment of the sensor system. Other structural health monitoring systems include self-powered sensors attached to or embedded within the components to be monitored that can reduce dependence on batteries or any other external power source. Such sensors can be relatively small in size and can utilize, as a power source, energy obtained or otherwise transmitted through the component or structure being monitored. Such devices can include those known as micro-electro-mechanical systems (MEMS). This type of sensor can typically consume very low amounts of power in the microwatt range. Other such devices can also include those known as piezoelectric devices. Some related piezoelectric devices can be in the form of actuators which can apply a force on the skin structure to dampen detected vibrations.

Other data capturing systems, such as that employing radiofrequency identification, can also be used in health monitoring. Such systems can include both active and passive wireless sensors (transponders and sensor elements) attached to or positioned within the component or structure to be monitored. The active wireless sensors can actively or passively collect and provide a continuous or intermittent stream of sampled raw data indicating parameters of the component or structure being monitored. The sensor data is typically collected by a central collector or by a series of intermediate collectors which provide such data to a central collector. The passive wireless sensors can also collect a continuous or intermittent stream of sampled raw data indicating parameters of the component or structure being monitored. The passive sensors, however, do not actively transmit such data, but instead receive energy from, for example, a mobile vehicle or handheld base device or reader positioned adjacent each wireless sensor, which provides power to extract the sensor data. The passive wireless sensors are most often utilized in applications where ultra low power communication is desired. In such passive systems, a reader can transmit a signal to each passive wireless sensor to power the sensor and to transmit a request for data. The request for data can be in the form of a request directed at a specific wireless sensor or the mere provision of energy in an applicable frequency band. In response to the signal from the reader, the wireless sensor can vary impedance of a wireless antenna, which the reader detects, to thereby receive raw sensor data.

There are two generally accepted methods of extracting data from such passive wireless sensors: inductive coupling and backscatter coupling. In both inductive coupling and backscatter coupling, the antenna of the reader generates a strong high frequency electromagnetic field which can penetrate the structure being monitored to interact with the wireless sensor antenna. Specifically, in interactive coupling, an electromagnetic field is radiated outward from the antenna of the reader to the passive sensor antenna. A portion of such field engages the antenna such that a voltage and a current are generated in a coil of the antenna, with a portion of the induced voltage rectified to provide direct current power to the sensor processor. The antenna coil of the passive sensor and a capacitor form a resonant circuit having a resonant frequency which corresponds to the transmission frequency of the reader. Basically, when the passive sensor is positioned within the magnetic field produced by the reader antenna, the combination of the reader antenna and the passive sensor antenna form a transformer-like inductive coupling, which allows the passive sensor to draw energy from the reader, which can be detected by the reader. By modulating this load on the passive sensor antenna, an amplitude modulated signal can be formed within the reader which can represent the data being transferred. Alternatively, by modulating the load at a sub-carrier frequency and by modulating the sub-carrier frequency using amplitude, frequency, or phase shift keying, a modulated signal having two sidebands can be formed within the reader which can represent the data being transferred.

In backscatter coupling, as with inductive coupling, an electromagnetic field is also radiated outward from the antenna of the reader to the passive sensor antenna. A portion of such electromagnetic field not attenuated induces a voltage in the passive sensor antenna. A portion of the induced voltage is rectified to provide direct current power to the sensor processor. Rather than form a transformer-like coupling, however, the passive sensor antenna is configured such that a portion of the incoming energy is reflected by the passive sensor antenna. Such reflected or backscattered energy can then be received by the reader antenna. The efficiency with which the antenna reflects such energy coincides with its reflection cross section. By modulating a load across the passive sensor antenna, the strength (amplitude) of the reflected signal at a given frequency can be modulated to represent the data being transferred.

In structural health monitoring applications or other applications in which a large number of wireless sensors may be in close proximity to each other, many of the passive communication schemes, due to limitations on available power, rely on inductive coupling and backscatter coupling, such as that described above, and thus, do not have the ability to be switched off. If a large number of passive sensors are in close proximity to each other, collisions in the physical layer are likely to occur, thus making data communication very inefficient. Various techniques have been used in active communication schemes to avoid collisions. Some of these techniques do not have an equivalent in passive communication schemes. Others require processing and power to function, both of which add to the complexity of the communication system. For active communication schemes, this problem has been addressed through the use of multiple access schemes such as time division, frequency division and code division multiple access-type communication schemes which utilize a spread spectrum and encoded data in a pseudorandom digital sequence. This problem has also been addressed by assigning individual unique identification numbers to each sensor. The reader can then individually address each sensor to request data. For passive communication schemes, this problem has been addressed through use of assigning each passive sensor a separate narrow band resonant frequency band.

Recognized by the applicant is the need to provide a passive sensor communication system that provides a multiple access communication scheme that can ensure that communication collisions between the sensors is managed and kept to a level that allows for usable communication to take place. Also recognized is the need to provide a passive sensor communication system that provides a multiple access communication scheme that is low power, and that has less complexity than conventional multiple access methods.

SUMMARY OF THE INVENTION

In view of the foregoing, embodiments of the present invention advantageously provide a communication system that provides a multiple access communication scheme that can ensure that communication collisions between sensor nodes is managed and kept to a level that allows usable communication to take place. Embodiments of the present invention also advantageously provide a communication system that includes a multiple access communication scheme that is low power, and that has less complexity than conventional multiple access methods.

More specifically, in an embodiment of the present invention, a system to monitor the health of a structure that can minimize data collisions between a plurality of structural health monitoring sensor nodes connected to the structure includes a structure to be monitored having a body, e.g., aircraft wing or fuselage, and a plurality of separate health monitoring sensor nodes each connected to or embedded within the body of the structure to monitor data related to parameters of a respective portion of the body of the structure. Such parameters can, for example, include strain (preferably temperature compensated), pressure, temperature, and acceleration. Each health monitoring sensor node can include a processor, a sensor element coupled to the processor and positioned to sense parameters of the respective portion of the body of the structure to define sensed parameters, and an antenna arrangement including an antenna and coupled to the processor to receive interrogation signals. The antenna arrangement advantageously can have an active tuned state and an inactive detuned state. Each health monitoring sensor node can also include, a power harvester coupled to the processor and the antenna arrangement to harvest power received therefrom, a power storage device to store harvested power, and memory coupled to the processor to store operating instructions and data therein.

The system also includes a health monitoring sensor node interrogator having an antenna arrangement and positioned to transmit a request for data to each of the plurality of health monitoring sensor nodes and to receive requested data therefrom. The interrogator has a preselected transmission power and interrogation signal frequency spectrum and a preselected data signal receive frequency spectrum having a preselected data receive frequency substantially coinciding with the resonant frequency of each of the plurality of health monitoring sensor nodes. Parameter processing program product separately stored in the memory of each of the plurality of health monitoring sensor nodes and including instructions that when executed by the respective processor perform the operations of processing the sensed parameters to define processed sensor data, selectively tuning the antenna arrangement to the preselected data receive frequency of the interrogator responsive to receiving a power and interrogation signal from the interrogator to thereby enable data transfer to the interrogator via passive radiofrequency communication, providing the processed sensor data to the interrogator, and selectively detuning the antenna arrangement from the preselected data receive frequency of the interrogator to thereby minimize data collisions with other ones of the plurality of health monitoring sensor nodes. Advantageously, the processor can signal a switch to vary the shape of the antenna to thereby vary the load seen by the health monitoring sensor node interrogator (inductive coupling), or to thereby vary the reflection cross-section of the antenna arrangement of the health monitoring sensor node (backscatter coupling).

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Low power structural health monitoring applications rely on the ability to efficiently communicate sensed data. In applications in which a large number of sensing nodes may be in close proximity to each other, communication between the sensor nodes and an interrogator or reader can be inefficient due to data collisions in the physical layer. Thus, advantageously, as illustrated in FIGS. 1–16, embodiments of the present invention provide a system, sensor nodes, program product, and methods to monitor the health of a structure that can minimize data collisions between a plurality of structural health monitoring sensor nodes connected to the structure.

Figure 1:
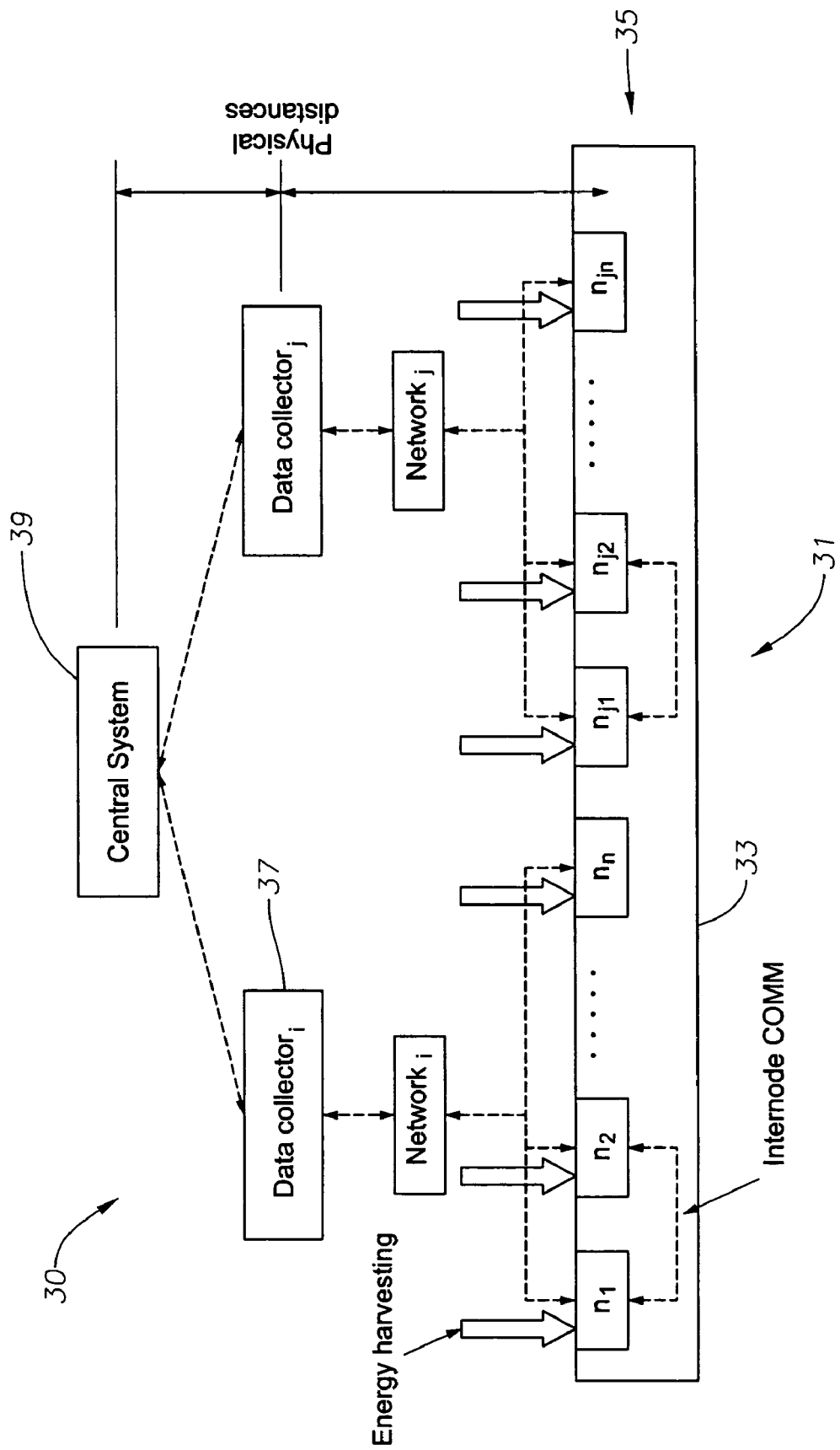
FIG. 1 is a schematic diagram of a general system architecture of a system to monitor the health of a structure according to an embodiment of the present invention.

As perhaps best shown in FIG. 1, a system 30 to monitor the health of a structure that can minimize data collisions includes a structure 31 having a body 33 or portion thereof to be monitored such as, for example, the leading-edge, a joint, or the skin of an aircraft wing. In general, the system 30 includes a plurality of health monitoring sensor nodes 35 positionable to monitor the health of the structure, one or more data collectors or interrogators 37 either positioned or positionable to supply power to and receive data from each of the health monitoring sensor nodes 35, and a central processor or computer 39 to compile the collected data to provide for both monitoring and managing the health of the structure 31.

Figure 2:
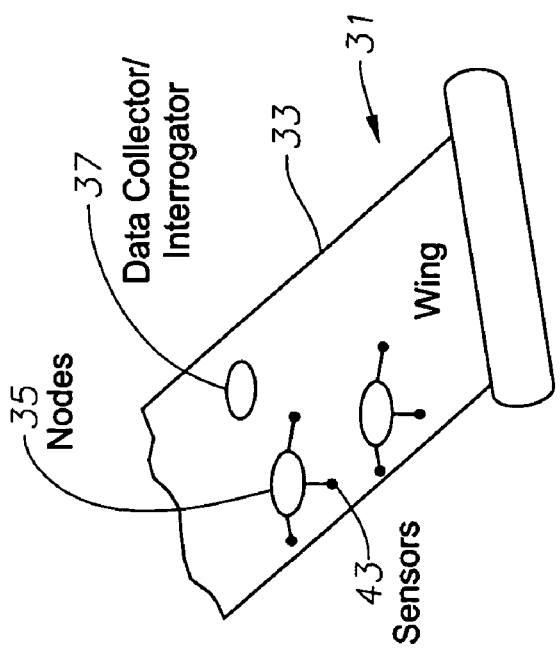
FIG. 2 is a partial environmental view of a system to monitor the health of a structure according to an embodiment of the present invention.

More specifically, as shown in FIG. 2, the system 30 includes a plurality of health monitoring sensor nodes 35 connected to or embedded within, for example, the aircraft skin, to monitor data related to various parameters of interest. Such parameters of interest can include, for example, temperature, pressure, strain which is preferably temperature compensated, and acceleration including vibration levels, just to name a few. According to various embodiments of the present invention, as many as twenty to thirty or more health monitoring sensor nodes 35 per square foot are positioned throughout strategic locations along the aircraft or other structure 31. Each health monitoring sensor node 35 can include a processor 41 (see, e.g., FIGS. 3 and 4) in communication with one or more sensor elements 43 connected to the processor 41 typically through either an electrical or a fiber-optic conductor. Each sensor element 43 is adapted to sense the various parameters of interest. Each sensor element 43 can be in the form of a strain gage, temperature sensor, pressure sensor, accelerometers, acoustic receiver, or other form of sensor known to those skilled in the art. Each health monitoring sensor node 35 can support one or more sensor elements 43 having either the same form or each having a separate form. For example, in order to provide temperature compensated strain, one sensor elements 43 can be a piezoelectric strain gage while the other can be a temperature sensor.

Figure 3:
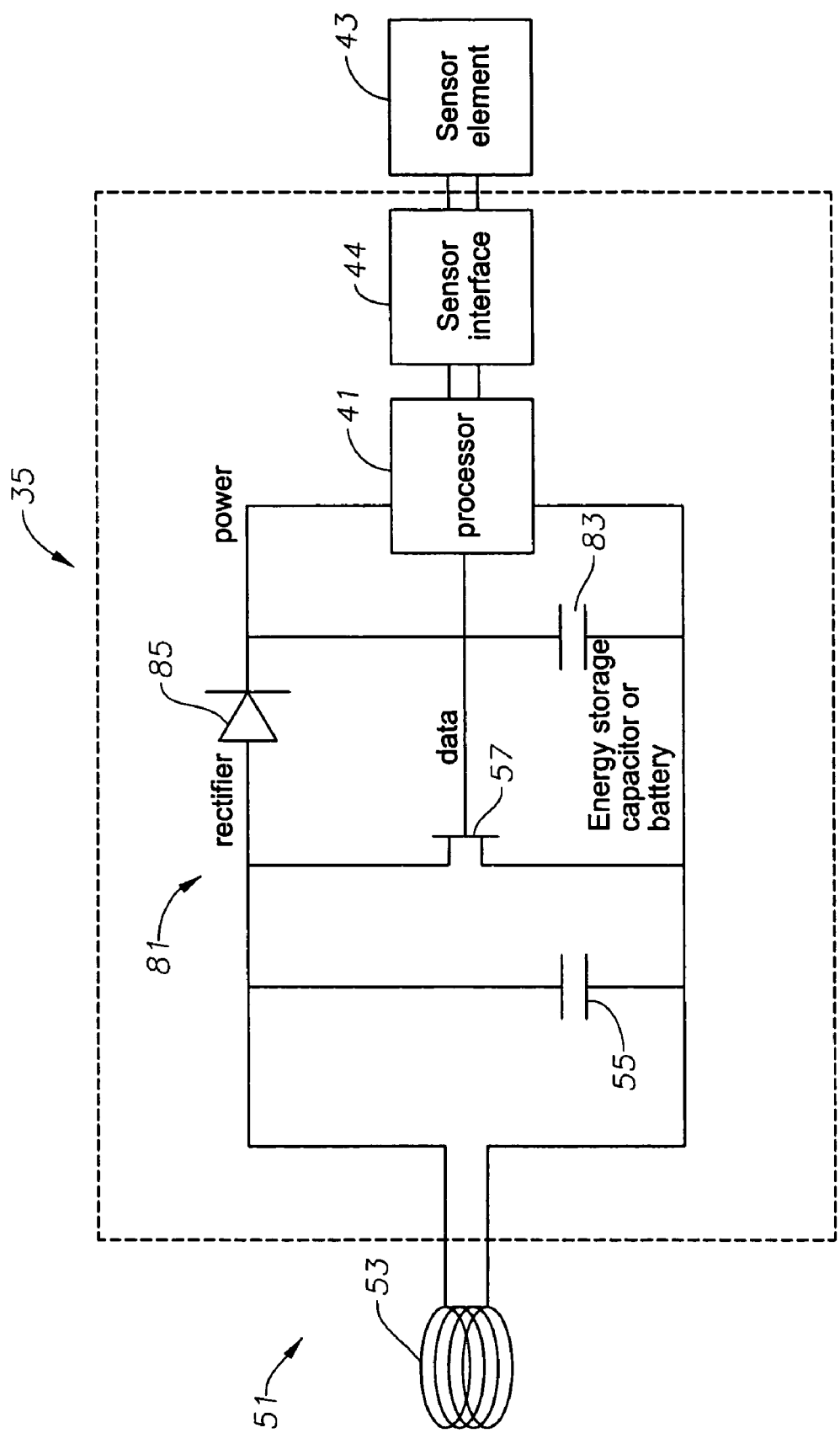
FIG. 3 is a schematic diagram of a health monitoring sensor node configured to modulate a load on an antenna arrangement according to an embodiment of the present invention.
Figure 4:
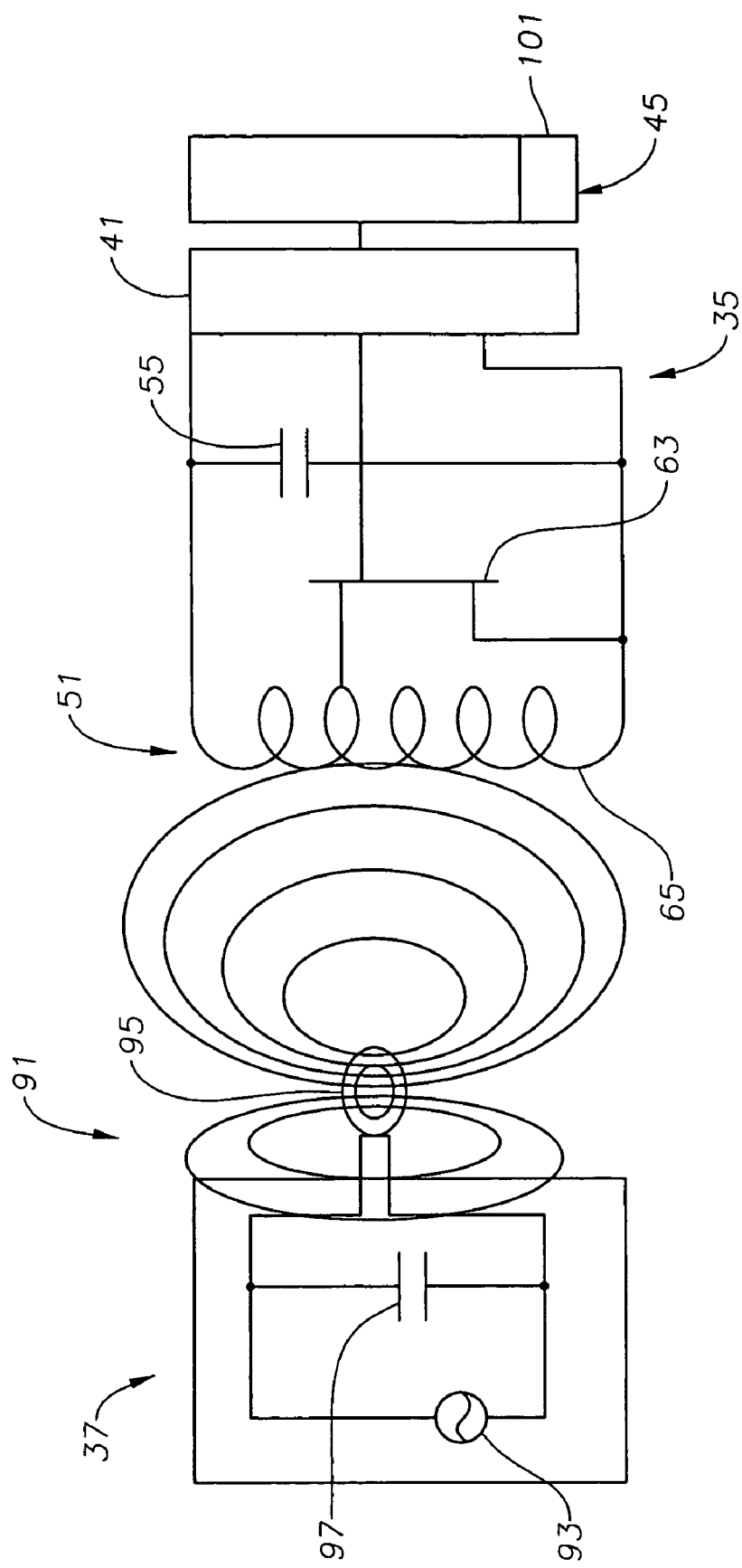
FIG. 4 is a schematic diagram of a health monitoring sensor node and health monitoring sensor node interrogator configured to communicate utilizing inductive coupling and having an adjustable antenna shape according to an embodiment of the present invention.
Figure 7:
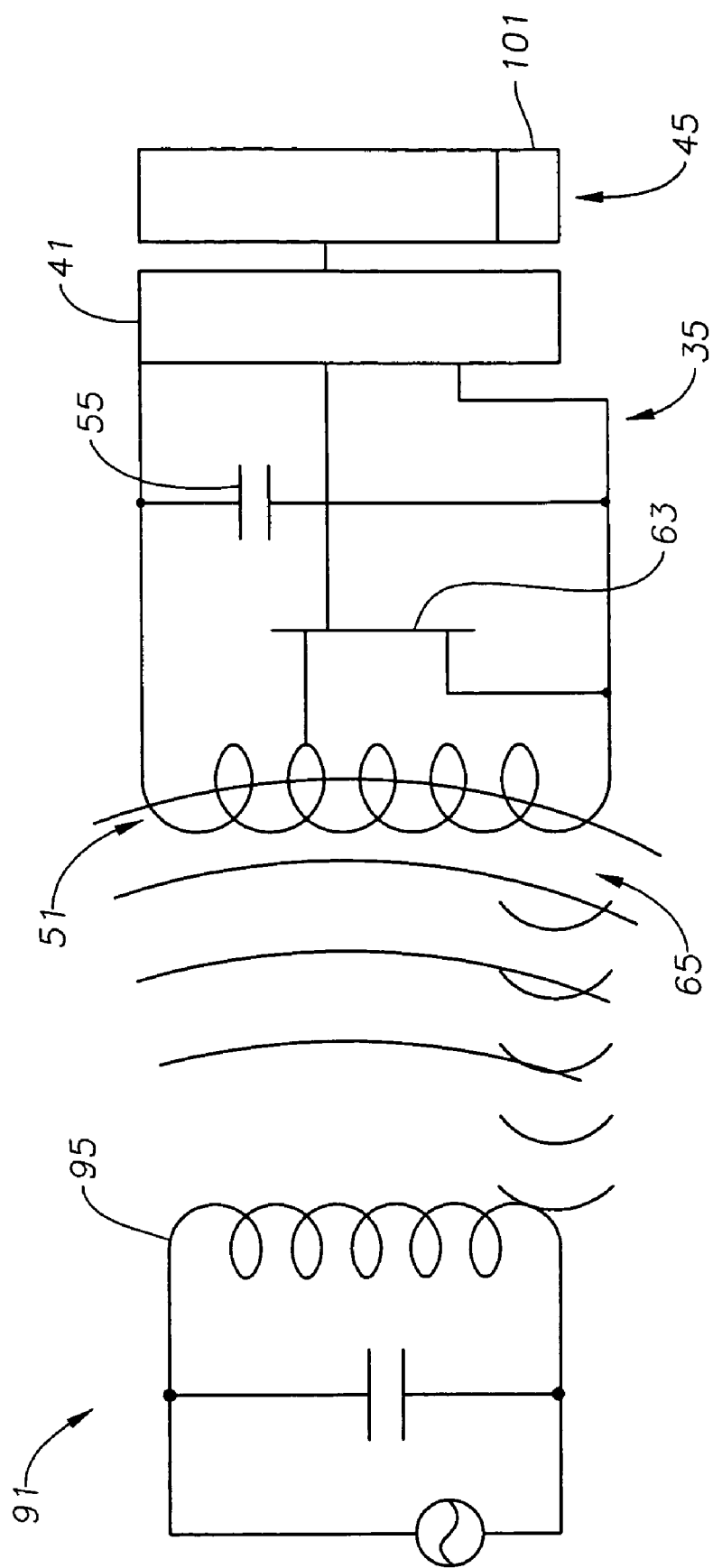
FIG. 7 is a schematic diagram of a health monitoring sensor node and health monitoring sensor node interrogator configured to communicate utilizing backscatter coupling and having an adjustable antenna shape according to an embodiment of the present invention.

As shown in FIGS. 3, 4, and 7, each health monitoring sensor node 35 can also include memory 45 coupled to a processor 41 to store operating instructions and to store data related to the parameters of interest. Such data can be in the form of either raw sensor data or a reduced form of the data such as, for example, a data structure summarizing the raw sensor data or summarizing information analyzed from the raw data. If the data from the sensor elements 43 is supplied in an analog form, a sensor interface 44 (see, e.g., FIG. 3) located within or external to the processor 41 can be used to prepare the sensor signal/data for use by the processor 41. For example, the sensor interface 44 can include a signal condition, amplifier, automatic gain control, analog to digital converter, and/or other active elements.

As shown in FIGS. 4–12, each health monitoring sensor node 35 can also include an antenna arrangement 51 coupled to the processor 41 to receive power and interrogation signals from a health monitoring sensor node interrogator 37. For illustrative purposes, regardless of the embodiment of the node 35, this indicator "51" will refer to the antenna arrangement for each node 35. The antenna arrangement 51 can include an inductor (antenna) 53 and a capacitor 55 that forms a circuit such as, for example, a parallel LC tank circuit, having a preselected resonant frequency. According to an embodiment of the present invention, the impedance of the antenna arrangement 51 can be adjusted in order to provide data to an associated circuit within the health monitoring sensor node interrogator or interrogators 37, described later. As such, each node 35 can also include an adjustable circuit or a circuit element such as, for example, a variable load resister or a mechanical or semiconductor switch 57, e.g., the field effect transistor illustrated in FIG. 3, in communication with the processor 41 can be positioned to vary parameters of the antenna arrangement 51 to provide a detectable data signal.

As shown in FIG. 3, according to an embodiment of the present invention, the switch 57 can function to vary the effective impedance of the tuned LC circuit to modulate the impedance of the antenna arrangement 51 to thereby provide to the interrogator 37 processed sensor data processed by the node 35, described later. Note, the switch 57, as described above, need not function literally as an on-off switch but may merely vary the effective impedance between, for example, the source and the drain, if implemented as a field effect transistor. Note also, the switch 57 can be alternatively positioned and/or alternatively implemented according to various other methodologies known to those skilled in the art. Note further, FIG. 3 illustrates a node with energy extracted from the coil (antenna) to power or assist powering the processor 41. Alternatively, a separate energy source can be available to power the microprocessor 41 independent of strategy energy from the coil.

As shown in FIG. 4, according to an embodiment of the present invention, the operating or resonant frequency of the antenna arrangement 51 can be adjusted or tuned within a preselected frequency band substantially away from one or more preselected resonant frequencies coinciding with a corresponding one or more transmission frequencies of a data collector or interrogator 37 to render the health monitoring sensor node 35 conceptually "invisible" or at least "less visible" to the data detection circuitry of the health monitoring sensor node interrogator 37, described later. Each node 35 can include an antenna arrangement tuner in the form of, for example, a switch 63 or other circuit or circuit element in conjunction with a coil antenna such as antenna 65 to change the shape of the antenna 65, to thereby adjust or to tune and to detune the antenna arrangement 51, to "activate" and "deactivate" the antenna arrangement 51. As shown in FIG. 4, the switch 63 may be connected to either a fixed or variable tap in a coil of the antenna 65, if so configured, to allow for changing the shape of the antenna 65, and thus, change the operating or resonant frequency. The switch 63 can function alone or in combination with the switch 57 illustrated in FIG. 3. If the antenna arrangement 51 circuit is implemented without switch 57, switch 63 can modulate the load by tuning and detuning the antenna arrangement 51. Note, as with switch 57, described previously, the switch 63, as described above, need not function literally as an on-off switch but may merely vary the effective impedance between, for example, the source and the drain, if implemented as a field effect transistor. Note also, the switch 63 can alternatively be positioned and/or alternatively implemented according to various other methodologies known to those skilled in the art. Note further, the switch can be in the form of a bistable switch 67 (see FIG. 11) or multistable switch 69 (see FIG. 12) positioned to tune or detune the antenna, and can be selectable between active and inactive states, whereby the switch requires power to actuate, but does not require power when stabilized in the active and inactive states. Examples include mechanical flip-flop switches and floating gate transistors, and combinations thereof, as known to those skilled in the art.

As described above, through use of such switch, e.g., switch 63, or other circuit arrangement, the antenna arrangement 51 can have an active tuned state which corresponds to being tuned to the preselected resonant frequency, i.e., data receive frequency of the health monitoring sensor node interrogator 37, and an inactive detuned state which corresponds to a frequency which renders the health monitoring sensor node 35 "invisible" or at least "less visible" to the data detection circuitry of the health monitoring sensor node interrogator 37. That is, each node 35 can include a switch, e.g., switch 63, that is in communication with the processor 41 and that is positioned to tune and to detune the antenna arrangement 51 to perform the activation and deactivation of the antenna arrangement 51, as described above. The tuned frequency or frequencies preferably coincide with one or more preselected resonant frequencies. If so configured, the detuned frequency can be either a preselected offset frequency offset from the one or more preselected resonant frequencies of the LC circuit of the antenna arrangement 51, or a random frequency constrained to fall within a preselected range.

Figure 5:
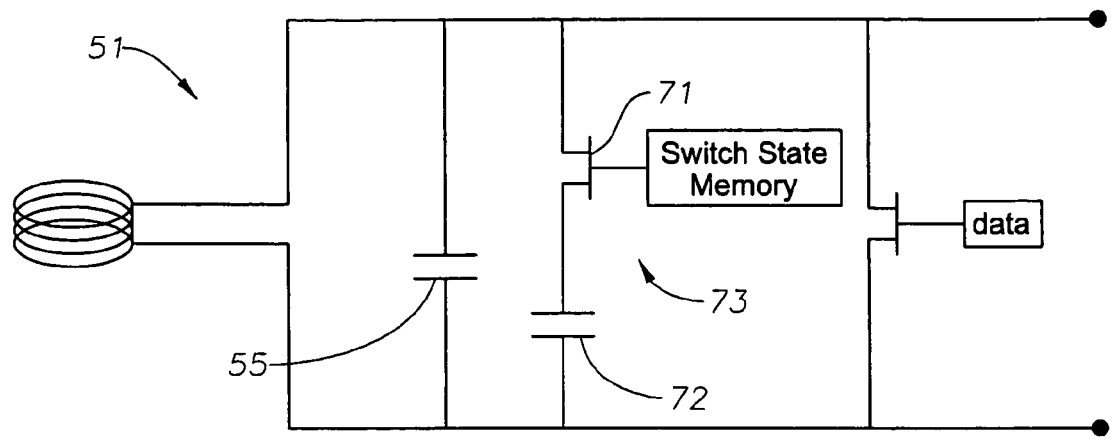
FIG. 5 is a partial schematic diagram of a health monitoring sensor node and health monitoring sensor node interrogator having an adjustable capacitive arrangement according to an embodiment of the present invention.
Figure 6:
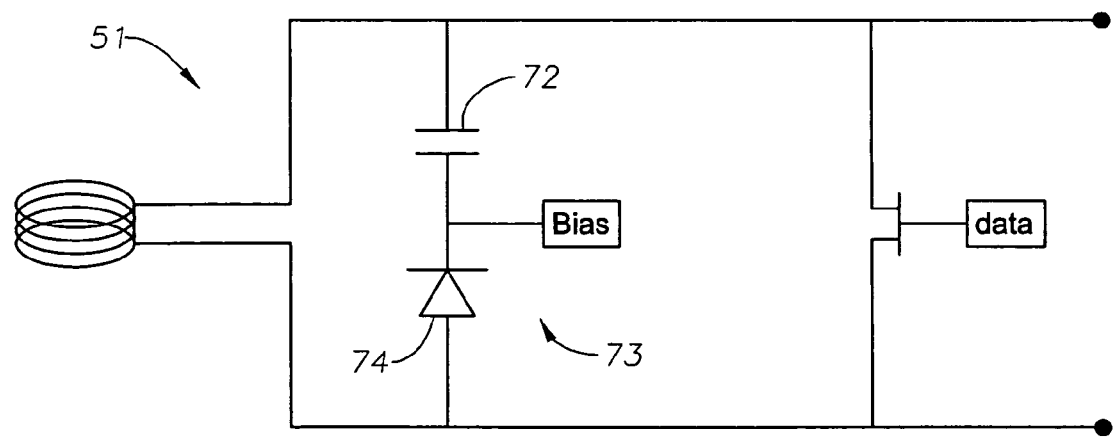
FIG. 6 is a partial schematic diagram of a health monitoring sensor node and health monitoring sensor node interrogator having an adjustable capacitive arrangement according to an embodiment of the present invention.

As shown in FIGS. 5–6, according to an embodiment of the present invention, one or more of the nodes 35 can include a capacitive arrangement 73 such as, for example, a capacitor 72 either alone or as part of an adjustment circuit and/or connected to a switch 71 (FIG. 5) or other circuit or circuit element such as, for example, diode 74 (FIG. 6) which is connected to a bias voltage which functions to change the capacitance of the diode 74. According to an embodiment of the present invention, the switch 71 or circuit providing the bias voltage is directly or indirectly in communication with the processor 41 to change the capacitance, and thus, the preselected resonant frequency of the antenna arrangement 51, to thereby adjust or to tune and to detune the antenna arrangement 51 to "activate" and "deactivate" the antenna arrangement 51. That is, through use of such alternative circuit arrangements, the antenna arrangement 51 can be varied by the processor 41 between the active tuned state which corresponds to being tuned to the preselected resonant frequency, i.e., data receive frequency of the health monitoring sensor node interrogator 37, and the inactive detuned state which corresponds to a frequency which renders the health monitoring sensor node 35 "invisible" or at least "less visible" to the data detection circuitry of the health monitoring sensor node interrogator 37.

As described and as will be described with respect to FIGS. 4–12, although the detuned frequency is synonymously identified with the antenna arrangement 51 being what has been described above as an inactive state, the antenna arrangement 51 is not necessarily inactive for all purposes. As will be described in more detail later, when in the inactive state, the antenna arrangement 51 can be harvesting power to provide power to run the processor 41 to control activation of the antenna arrangement 51 and delivery of the data. Correspondingly, although at least a subset of the nodes 35 can obtain power directly from the aircraft or from a chemical battery, or can independently harvest power according to various methodologies known to those skilled in the art and/or according to the methodologies as described in a co-pending U.S. Non-Provisional patent application Ser. No. 11/287,009 by Berkcan, et al. titled "System to Monitor the Health of Structural Components, Sensor Nodes, Program Product, and Related Methods," filed on Nov. 23, 2005, incorporated herein by reference in its entirety, according to the preferred embodiment of the present invention, the nodes 35 include a power storage circuit or device, e.g. device 81, to store power received through the antenna. For example, a relatively simple circuit such as the illustrated capacitor or battery 83 and diode 85 pair illustrated in, e.g., FIG. 3 (device 81), or a capacitor or battery and rectifier pair (not shown), when provided electrical energy generated from electromagnetic energy received through the antenna of the antenna arrangement 51, generally at the tuned or detuned frequency or frequency range, can store energy sufficient for the processor 41 to provide for transferring stored data to an associated health monitoring sensor node interrogator 37. Note, various other circuit designs known to those skilled in the art can be utilized to harvest and/or store energy obtained from the antenna arrangement 51 and are within the scope of the present invention.

As shown in FIGS. 1, 4, 7, 13, and 14, according to embodiments of the present invention, the system 30 includes one or more data collectors or interrogators such as, for example, interrogator 37 having an antenna arrangement 91 coupled to a frequency source 93 to provide power to and to receive or "read" data from the health monitoring sensor nodes 35. The antenna arrangement 91 can include an inductor (antenna) 95 and, e.g., a capacitor 97, that form a circuit such as, for example, the parallel LC tank circuit, described with respect to the health monitoring sensor nodes 35, having a preselected operating or resonant frequency matching that of the health monitoring sensor nodes 35. According to one embodiment of the present invention, this circuit arrangement can also provide interrogation signals to each of the health monitoring sensor nodes 35. According to another embodiment of the present invention, the data collector or interrogator 37 is configured to include multiple resonant frequencies or a sweeping resonant frequency such that the data collector or interrogator 37 transmits over multiple preselected frequencies coinciding with the detuned frequency or frequency range, and/or with the resonant frequency of various subsets of nodes 35 having, for example, separate and spaced apart operating or resonant frequencies. According to yet another embodiment of the present invention, the interrogator 37 transmits over a broadband frequency spectrum in order to provide a power and interrogation signal over a range of frequencies coinciding with the various tuned and detuned frequencies of the health monitoring sensor nodes 35 so that each node 35, regardless of its state, is provided power and can be accessed to retrieve sensor data therefrom. Regardless of the transmission methodology, the health monitoring sensor node interrogator 37 preferably only needs to monitor a narrowband frequency coinciding with the primary preselected operating or resonant frequency or frequencies of the health monitoring sensor nodes 35, to thereby read the data therefrom.

As shown in FIGS. 3–12, according to an embodiment of the present invention, the health monitoring sensor nodes 35 can utilize a passive communication scheme whereby, as described above, the sensor nodes 35 obtain power from the health monitoring sensor node interrogator 37 to provide or otherwise send the respective data message. As such, each health monitoring sensor node interrogator 37—health monitoring sensor node 35 combination can utilize one of various communication methodologies such as, for example, inductive coupling in the near field or backscatter coupling in the near or far field to provide for the passive communication data retrieval from the health monitoring sensor nodes 35.

As perhaps best shown in FIGS. 4–6, with respect to inductive coupling, the health monitoring sensor nodes 35 can include a near field communication arrangement which enables communication by modulating the load of the receiving antenna arrangement 91 on the interrogator 37. This communication arrangement can typically operate on a frequency between 100 to 150 kHz, preferably 125 kHz, which can provide a capability of penetrating at least one inch of carbon fiber or other conductive material which may form the aircraft component or structure to be monitored. An electromagnetic field is radiated outward from the antenna 95 of the interrogator 37 to the passive sensor antenna of the health monitoring sensor nodes 35. At least a portion of the field at or around the operating or resonant frequencies of both tuned and detuned health monitoring sensor nodes 35 engages the antenna 65 such that a voltage and a current are generated in the antenna 65. As shown, for example, in FIG. 3, if the node 35 requires power from the interrogator 37, the node can include a power storage and power conditioning device 81 known to those skilled in the art and, e.g., positioned so that a portion of the induced voltage can be cropped by diode 85 or rectified by a bridge circuit (not shown) to charge a capacitor, e.g. capacitor 83, to thereby provide direct current power to the sensor node processor 41.

A resulting transformer-like inductive coupling is formed which allows the passive sensor node to form a load on the health monitoring sensor node interrogator 37. This "load" on the interrogator 37 can be detected by a relatively simple circuit known to those skilled in the art. Using, for example, either switch 57, 63, 67, 69 or 71, the processor of each node 35 can modulate this load, thus forming within the interrogator 37 an amplitude modulated signal which represents the data being transferred. Alternatively, the processor 41 can modulate the load at a sub-carrier frequency to form within the interrogator 37 a modulated signal having sidebands which can represent the data being transferred. The health monitoring sensor node interrogator 37 senses the change in load. This change in load can be interpreted as either the "1" or "0" of a packet including data typically extracted by the processor 41 from the memory 45 and provided to the health monitoring sensor node interrogator 37.

As perhaps best shown in FIG. 7, with respect to backscatter coupling, as with inductive coupling, the health monitoring sensor nodes 35 can include a passive communication arrangement which enables communication by modulating the load across or resonant frequency of the antenna arrangement 51 of each node 35. An electromagnetic field is radiated outward from the antenna 95 of the interrogator 37 to the passive sensor antenna of the various health monitoring sensor nodes 35. At least a portion of the field not attenuated at or around the operating frequencies of both tuned and detuned health monitoring sensor nodes 35 induces a voltage in each sensor node antenna 65. If power is required from the interrogator 37, a portion of the induced voltage is cropped or rectified to provide direct current power to the sensor node processor 41 utilizing a device such as, for example, the power storage and power conditioning device 81 illustrated in FIG. 3. Rather than form a transformer-like coupling, however, in backscatter coupling the sensor node antenna is configured such that a portion of the incoming energy is reflected by the antenna 65. Such reflected or backscattered energy can then be received by the health monitoring sensor node interrogator antenna 95 and detected by a relatively simple circuit known to those skilled in the art. The efficiency with which the sensor node antenna reflects such energy coincides with its reflection cross section.

Using, for example, either switch 57, 63, 67, 69, 71, or phased array antenna element (FIGS. 8, 9, or 10), described below, the processor of each node 35 can modulate this reflection cross-section, whereby the strength (amplitude) of the reflected signal at a given frequency or alternatively the frequency of the reflected signal can be modulated to represent the data being transferred. The health monitoring sensor node interrogator 37 can sense the modulated signal, which can be interpreted as either the "1" or "0" of a packet including data typically extracted by the processor 41 from the memory 45 and provided to the health monitoring sensor node interrogator 37.

Figure 8:
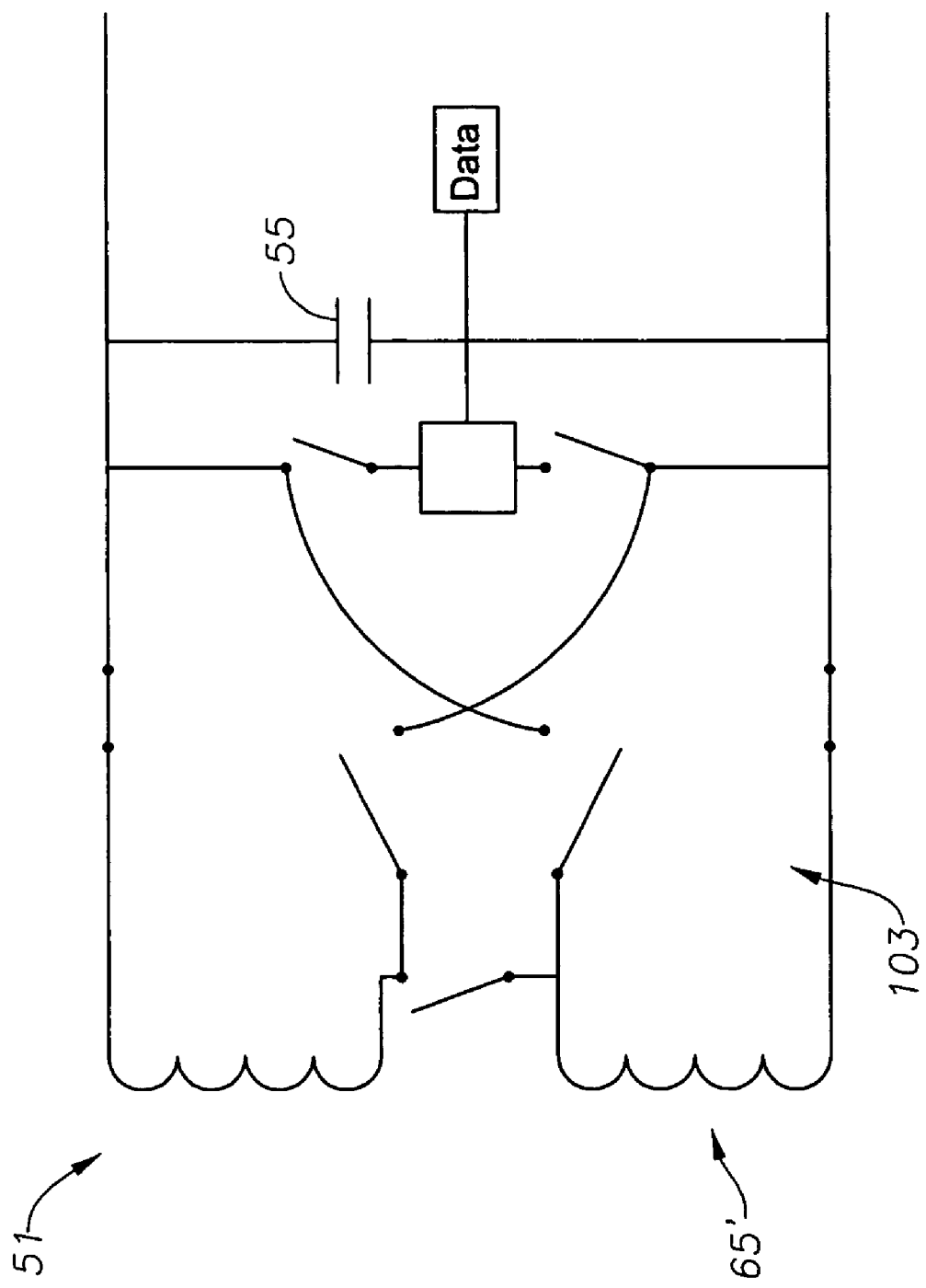
FIG. 8 is a partial schematic diagram of a health monitoring sensor node configured to communicate utilizing radiation pattern tuning according to an embodiment of the present invention.

As shown in FIG. 8 by way of example only, the antenna of the health monitoring sensor nodes 35 can be configured to include multiple series or parallel segments such as, for example, in the form of a phased array antenna, e.g., antenna 65', a sparse array, or an arbitrary array, as known to those skilled in the art. The nodes 35 can be configured so that rather than changing the shape of the antenna or rather than merely changing the shape, thus changing the inductance of the antenna arrangement 51, or changing the capacitance of the antenna arrangement 51 to tune the antenna arrangement 51, the nodes 35 can be configured to change either the phase or amplitude of one or more of the segments to thereby vary the radiation vector or pattern of the signal reflected by the antenna arrangement 51. Advantageously, by changing the radiation pattern, the signal can be steered or otherwise directed away from one of the interrogators 37 and towards another interrogator 37 to adjacent interrogator 37. This allows for groups of nodes 35 to selectively communicate with one or more interrogators 37, as necessary, to minimize collisions. The radiation pattern can be changed according to various methodologies such as, for example, changing the polarity of one or more of the segments or changing the phase or magnitude of the data provided to one or more of the segments. As known by those skilled in the art, such phase change can, for example, be accomplished through use of a delay circuit (not shown).

Figure 9:
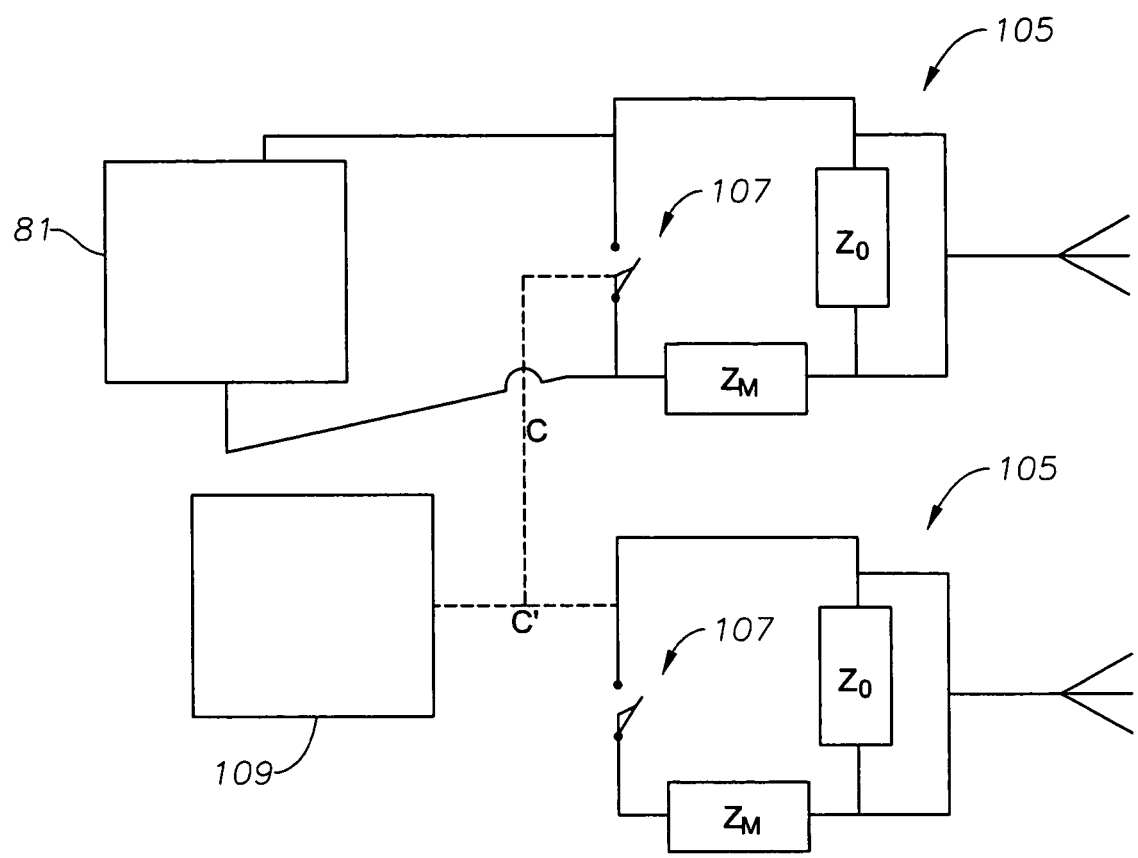
FIG. 9 is a partial schematic diagram of a health monitoring sensor node configured to communicate utilizing radiation pattern tuning according to an embodiment of the present invention.
Figure 10:
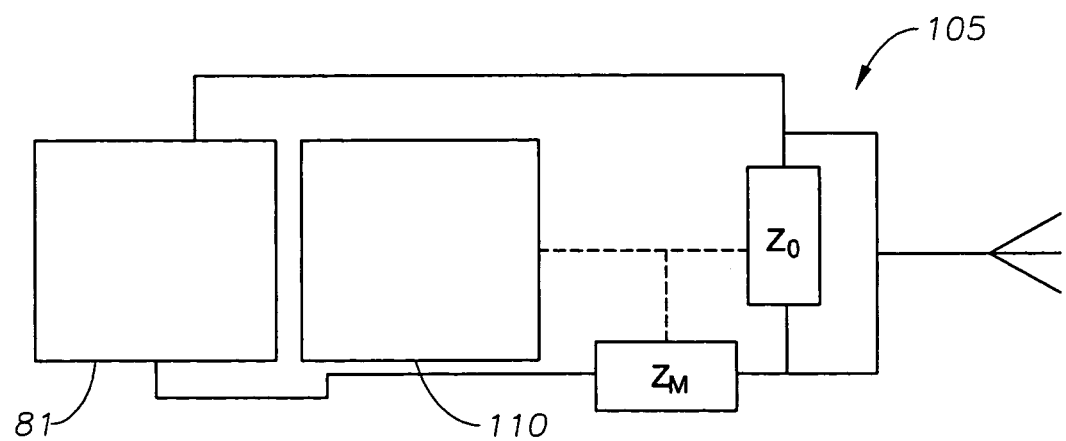
FIG. 10 is a partial schematic diagram of a health monitoring sensor node configured to communicate utilizing radiation pattern tuning according to an embodiment of the present invention.
Figure 11:
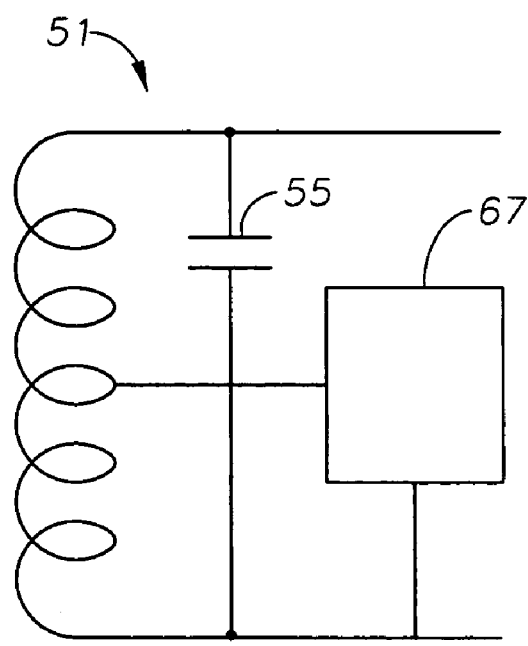
FIG. 11 is a partial schematic diagram of a health monitoring sensor node configured to include a bistable switch according to an embodiment of the present invention.
Figure 12:
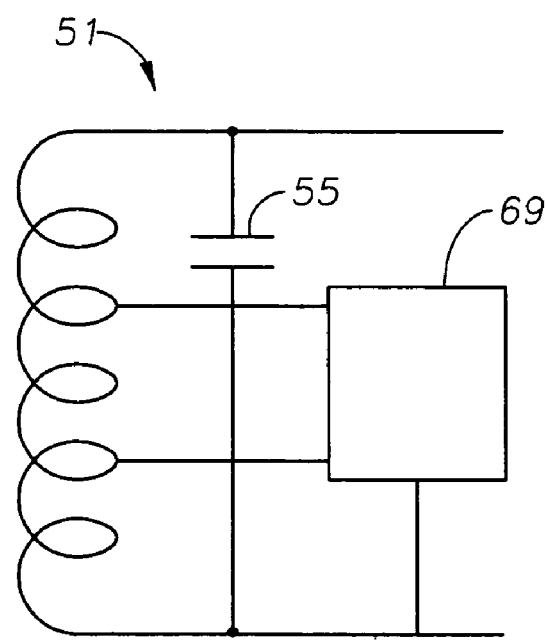
FIG. 12 is a partial schematic diagram of a health monitoring sensor node configured to include a multistable switch according to an embodiment of the present invention.

As shown in FIGS. 9–10, the phased array, sparse array, or an arbitrary array, can be formed obtained by repeating the antenna elements 105 with spatial relationship or spatial periodicity related to a specified function of the wavelength of the radiation, for example by spacing the elements in a grid with half-wavelength spacing between adjacent elements. As shown in FIG. 9, the individual antenna elements 105 can be controlled by separate antenna element switches 107 operatively connected to a phase and amplitude controller in the form of, e.g., a switch controller 109, or, for example, can have their respective impedances adjusted by a phase and amplitude controller in the form of, e.g., an impedance controller 110, as shown in FIG. 10. Note, subsets of a plurality of antenna elements 105 can each be controlled by the phase and amplitude controller 109, 110. This can be particularly advantageous for very large arrays. Alternatively, the antenna elements 105 can be separately controlled by individual phase and amplitude controllers 109, 110, provided either within or in communication with one or more nodes 35.

Figure 13:
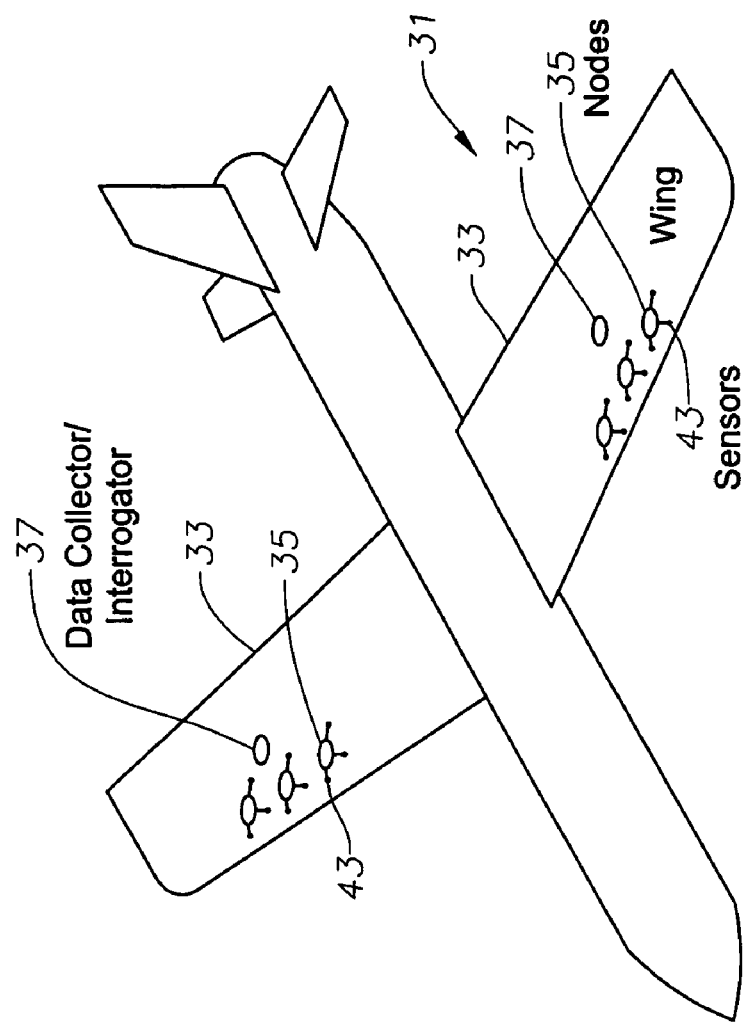
FIG. 13 is an environmental view of a system to monitor the health of a structure according to an embodiment of the present invention.
Figure 14:
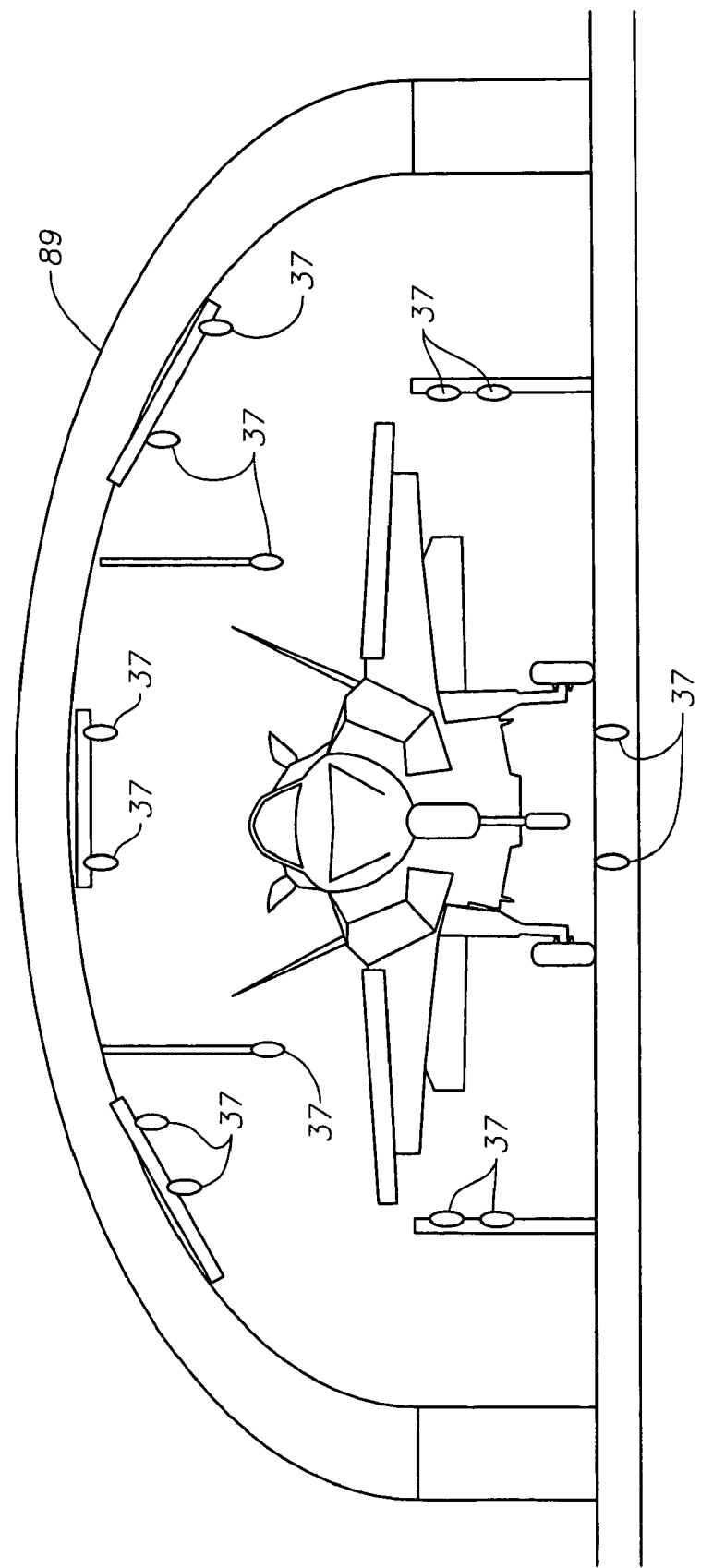
FIG. 14 is an environmental view of a system to monitor the health of a structure according to an embodiment of the present invention.
Figure 15:
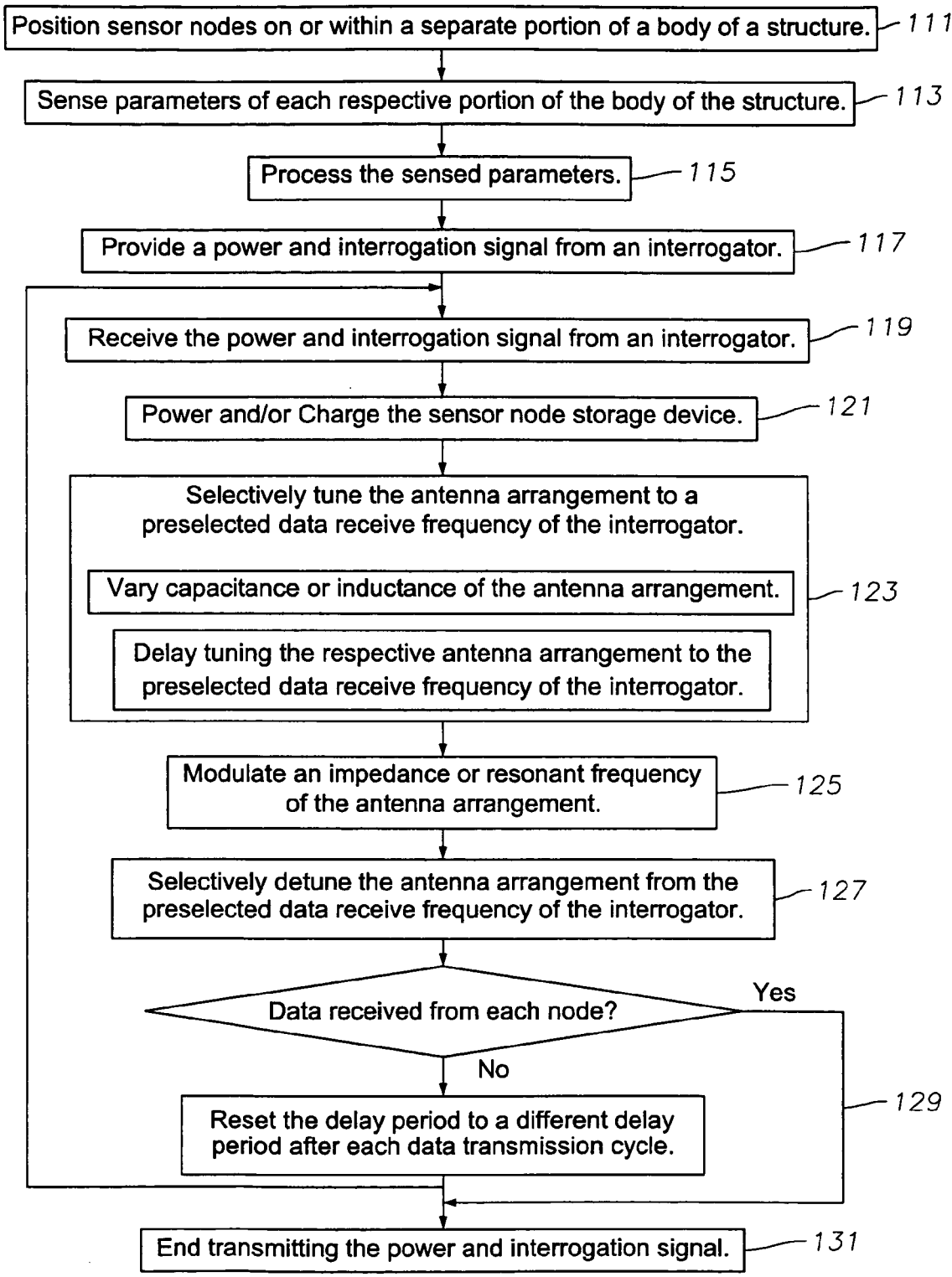
FIG. 15 is a schematic flow diagram of a method of minimizing data collisions between a plurality of structural health monitoring sensor nodes connected to a structure according to an embodiment of the present invention.

According to an embodiment of the present invention, as shown in FIG. 13, the health monitoring sensor node interrogator or interrogators 37 can be connected to the aircraft or other structure 31 to service adjacent groups of health monitoring sensor nodes 35. According to another embodiment of the present invention, the interrogator 37 can be handheld or otherwise mobile so that the interrogator 37 can be positioned adjacent each health monitoring sensor nodes 35 to retrieve data therefrom. According to yet another embodiment of the present invention, as shown in FIG. 14, the interrogator 37 can be connected within a fixed structure such as, for example, a gate 89 within a hanger or other fixed facility, so that when the aircraft or other mobile structure 31 passes through the gate 89, the health monitoring sensor nodes 35 can be interrogated and data can be retrieved.

As identified above, according to an embodiment of the present convention, a large number of wireless health monitoring sensor nodes 35 can be positioned in close proximity to each other. As such, with respect to clusters or sets of health monitoring sensor nodes 35 having the same or similar operating or resonant frequency, collisions in the physical layer are likely to occur, thus making data communication very inefficient. Unlike active communication schemes, for passive communication schemes which, for example, typically rely on inductive coupling and backscatter coupling such as that described above, the antenna arrangement 51 of the health monitoring sensor nodes 35 cannot be readily switched on or off, in the traditional sense. Thus, as shown, for example, in FIGS. 4, 5, 6, 7 and 8, advantageously, the antenna arrangement 51 and/or the processor, typically via the various operating instructions, allow detuning or alternate of the antenna arrangement 51 of each health monitoring sensor node 35 to minimize interference with other adjacent health monitoring sensor nodes 35 so that the data of the each of the health monitors sensor nodes 35 can be efficiently provided to the health monitoring sensor node interrogator 37.

Advantageously, as described above, according to embodiments of the present invention, a switch, such as, for example, switch 63, 67, 69, 71, or other circuit having a similar function such as, for example, switch array 103 (FIG. 8) antenna element switches 107 and switch controller 109 (FIG. 9), or impedance controller 110 (FIG. 10), collectively defining an antenna arrangement tuner, can be controlled by a timing circuit or arrangement either within or separate from the processor 41, to perform the tuning and/or detuning. According to one embodiment, the antenna arrangement tuner can be controlled via a timing circuit that has a fixed delay. According to another embodiment, different nodes 35 can utilize different delays. In the preferred embodiment of the present invention, the delay is variable or pseudorandom within a predetermined range so that if a collision occurs, the nodes 35 will not continue to collide indefinitely.

For example, a pair of adjacent health monitoring sensor nodes 35 receive an interrogation signal and attempt to respond. If a collision occurs, the same health monitoring sensor node interrogator 37 may not be able to detect the data being provided. Through use of the variable or different delay, however, one of the nodes 35 will eventually be in a detuned state while the other is in a tuned or active state. Through use of, for example, a node identification scheme, the interrogator 37 can continue interrogation of the nodes 35 until each node's data is indicated or identified as received. Note, the use of a variable delay is preferred because, although possibly very slightly less communication efficient than each node 35 having a preselected delay due to the potential for a pair of nodes 35 selecting the same delay at the same time, utilizing the variable delay, there is no need to keep records of or program a different delay in each adjacent node 35. Note also, according to the preferred embodiment of present invention, the health monitoring sensor nodes 35, which may be inactive upon interrogation, can begin a cycle of attempting to provide data to the interrogator 37 upon receiving or storing sufficient power to do so or can immediately begin the cycle of attempting to provide data upon receiving the power and interrogation signal from the health monitors sensor node interrogator 37, if an additional power source is provided or if a power storage device is already sufficiently charged.

According to another embodiment of the present invention, rather than merely provide a dataless power signal, e.g., signal devoid of any data, which can nevertheless function as an interrogation signal, the interrogator 37 can transmit a node identification, e.g., 0001 in binary for a first node 35 having such assigned identification to individually request a specific node 35 provide data thereof. The addressed node 35 can then change the state of its respective antenna arrangement tuner from active to inactive, or vice versa, depending on the configuration, to allow provision and/or modulation of data. Further, the state of the antenna arrangement tuner can be changed back either autonomously, or through another command received from the interrogator 37. Note, for efficient implementation of this embodiment, the health monitoring sensor node interrogator 37 provides the power signal over either a broadband frequency spectrum covering both detuned and tuned frequencies or a series of narrowband frequencies associated with the preselected tuned and preselected detuned frequencies of associated nodes 35. According to an embodiment of the present invention, the health monitoring sensor nodes 35 are, however, normally in the detuned state so that, upon receiving the node identification for the respective node 35, the respective node 35 has generally collision free access to the tuned frequency spectrum.

According to embodiments of the present invention, rather than providing an individually tailored circuit arrangement, each health monitoring sensor node 35 can be implemented as shown, for example, in FIGS. 4–12, using a processor 41 having operating instructions and parameter processing program product 101 stored in memory 45, which includes instructions that when executed by the processor 41 perform the various operations described above. Note, the program product 101 can be in the form of microcode, programs, routines, and symbolic languages that provide a specific set for sets of ordered operations that control the functioning of the hardware and direct its operation, as known and understood by those skilled in the art.

According to embodiment of the present invention, the parameter processing program product 101, for example, can include those instructions to perform the operations of processing the sensed parameters sensed by the sensor elements 43 (FIG. 2) to define processed sensor data, selectively tuning the antenna arrangement 51 to or detuning the antenna arrangement 51 from a preselected data receive frequency of the interrogator 37 responsive to receiving a power and/or interrogation signal from the health monitoring sensor node interrogator 37, providing the processed sensor data to the interrogator 37 after tuning the antenna arrangement 51 to the preselected data receive frequency, and selectively detuning the antenna arrangement 51 from the preselected data receive frequency of the interrogator 37, to thereby minimize data collisions with other adjacent health monitoring sensor nodes 35. Note, according to an embodiment of the present invention, the processor 41 can provide for tuning or detuning the antenna arrangement 51 by varying the capacitance or inductance of either the capacitor or antenna of an LC circuit of the antenna arrangement 51, through use of, e.g., switch 63, 67, 69, or 71, respectively, or by varying the phase, polarity, or amplitude of the data signal across a segment of the antenna 65' or antenna element of a phased, sparse, or arbitrary array, as known to those skilled in the art, described previously. Note also, the detuned frequency can be a second preselected frequency or a frequency randomly selected from within a predetermined frequency range, as also previously described. Note further, the processor 41 can provide the processed data to the interrogator 37 either through manipulation of the above tuning function or through load modulation across the LC circuit through use of, e.g., switch 57, as described previously.

Further, according to embodiments of the present invention, the instructions can also include those to perform the operations of enabling the tuning of the antenna arrangement 51, generally in response to passage of a delay period after receiving the power and interrogation signal. According to one embodiment of the present invention, this can be accomplished by, e.g., activating the switch 63, 67, or 69, to provide a substantially short circuit condition to a portion of the respective antenna 55 to thereby tune or to detune the antenna arrangement 51 or controlling an element such as, for example, a phase and amplitude controller. Each node 35 can be programmed to have a different delay period to thereby minimize the data collisions. Alternatively, the delay period can be said or otherwise programmed to be pseudo-random within a preselected range.

According to another embodiment of the present invention, the instructions can include those to perform the operations of iteratively tuning the antenna of the antenna arrangement 51, through, for example, the switch 63 or other circuit having a similar function known to those skilled in the art, to enable data transfer, and similarly detuning the antenna of the antenna arrangement 51, generally in response to receiving the power and interrogation signal, and resetting the delay to a different delay period after each tune-detune data transmission cycle.

According to another embodiment of the present invention, the instructions can include those to perform the operations of iteratively tuning and detuning the antenna arrangement 51 of the respective node 35 generally responsive to receiving the power and interrogation signal, with the tuning performed to enable data transfer, and the detuning performed to reduce saturation of the preselected data receive frequency of the interrogator 37. Such tuning and detuning can be accomplished, as described above, by varying the capacitance or inductance of the antenna arrangement 51, preferably through operation of, e.g., switch 63, 67, 69, or 71, respectively, or by biasing diode 74, or by directing the antenna arrangement 51 or signal away from the interrogator 37 by directly or indirectly controlling a phased, sparse, or arbitrary array, described previously. According to this embodiment, the instructions can also include those to perform the operation of resetting the delay period to a different delay period after each tune-detune data transmission cycle to thereby minimize the data collisions.

According to another embodiment of the present invention, the instructions can include those to perform the operation of a health monitoring sensor node 35 receiving in the power and interrogation signal an interrogation including a node identification of the respective health monitoring sensor node 35, and enabling the switch 63, 67, 69 or 71, or provide a biasing voltage to diode 74, to tune the antenna arrangement 51 to the preselected data receive frequency of the interrogator 37, responsive to receiving the node identification.

According to another embodiment of the present invention, the instructions can include those to perform the operation of the tuning the antenna arrangement 51 by modulating or adjusting either the phase, polarity, or magnitude of the antenna signal to thereby vary the radiation pattern (reflection direction) to reflect away from an interrogator 37 or reflect away from a first interrogator 37 and towards a second interrogator 37.

It is important to note that while embodiments of the present invention have been described in the context of a fully functional system those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs) or erasable, electrically programmable read only memories (EEPROMs), recordable type media such as floppy disks, hard disk drives, CD-ROMs, CD-R/RWs, DVD-ROMs, DVD-RAMs, DVD-R/RWs, DVD+R/RWs, flash drives, and other newer types of memories, and transmission type media such as digital and analog communication links. For example, such media can include both operating instructions and instructions related to the parameter processing program product 101 described above and much of the method steps described below.

As shown in FIGS. 1–16, embodiments of the present invention include methods of minimizing data collisions between pluralities of structural health monitoring sensor nodes 35. For example, as perhaps best shown in FIG. 15, a method of minimizing such data collisions can include the step of positioning each of a plurality of separate wireless health monitoring sensor nodes 35 on or within a portion of a body of a structure (block 111), sensing parameters of each respective portion of the body of the structure (block 113) by each of the plurality of health monitoring sensor nodes 35, and processing the sensed parameters (block 115) by each of the plurality of health monitoring sensor nodes 35. Note, each node 35 can include an antenna arrangement 51 having an active tuned state and an inactive detuned state.

The method can also include providing a power and interrogation signal by a health monitoring sensor node interrogator 37 or reader (block 117). This signal can be a broad spectrum signal or a signal having two or more narrow band frequency ranges in order to communicate with and power both active and inactive nodes 35. According to an embodiment, the signal can be devoid of specific interrogation information, but nevertheless can function as both an interrogation and a power providing signal which, either when detected or when an associated power storage device or portion thereof associated with each respective node 35, e.g., capacitor 83, is sufficiently charged, can be interpreted by the respective node 35 to be a request for data. Until each node 35 has successfully provided data to the interrogator 37, the method can include receiving the power and interrogation signal from an interrogator 37 by each of the plurality of health monitoring sensor nodes 35 (block 119) to thereby power and/or charge each respective node 35 (block 121).

The method can further include selectively and/or iteratively tuning the antenna arrangement 51 of each node 35 (block 123) to a preselected data receive frequency of the interrogator 37 in response to the power and interrogation signal to thereby enable data transfer to the interrogator 37. Note, this frequency can be a different frequency for each of a plurality of sets of nodes 35. That is, the interrogator 37 can have a respective data receive frequency adjusted sequentially or can monitor multiple data receive frequencies to receive data from multiple subsets of nodes 35 separately tuned to such multiple data receive frequencies. Further, the tuning step can be performed by varying the inductance of an inductor, e.g., antenna of the antenna arrangement 51, forming an LC circuit of the antenna arrangement 51, by, for example, short-circuiting a portion of the antenna of the antenna arrangement 51, by varying the capacitance of a capacitive arrangement forming the LC circuit, or by adjusting the phase, polarity, or amplitude of the data signal across a portion of the antenna 65. This step can also include delaying tuning the respective antenna arrangement 51 to the preselected data receive frequency of the interrogator 37 in response to passage of a delay period after receiving the power and interrogation signal. Advantageously, each node 35 can have a different delay period to thereby minimize the data collisions. Rather than being confined to a fixed or revolving delay period, the delay period can be pseudorandom within a preselected range.

The method can also include the step of either modulating an impedance of the antenna arrangement 51 of each respective node 35 or modulating the resonant frequency of the antenna arrangement 51 (block 125), to thereby provide to the interrogator 37 processed sensor data processed by each node 35. The impedance of the antenna can be modulated using a circuit such as, for example, switch 57 in communication with the processor 41 (see FIG. 3). The resonant frequency can be modulated using a circuit such as, for example, one including switches 63, 67, 69, or 71, in communication with the processor 41 (see FIGS. 4, 7, 11, and 12), by providing a biasing voltage to diode 74 (see FIG. 6), or other circuit having a similar function such as, for example, switch array 103 in conjunction with switch controller 109 (FIG. 8), or impedance controller 110 (FIG. 10). In an inductive coupling arrangement, such modulation can result in a variation in a load at the preselected receive data frequency as seen by the interrogator 37. In a backscatter coupling arrangement, such variation can result in a change in the reflection cross-section of the antenna.

The method can further include the step of selectively detuning the antenna arrangement 51 of the each respective node 35 from the preselected data receive frequency of the interrogator 37 (block 127) to thereby minimize data collisions with other adjacent health monitoring sensor nodes 35. Note, the steps of selectively tuning the antenna arrangement 51, providing the data, followed by detuning the antenna arrangement 51 of the respective node 35, can also include iteratively either tuning or detuning the antenna arrangement 51 followed by resetting the delay period to a different delay period (block 129) so that no two adjacent nodes 35 continuously have the same delay period to thereby minimize data collisions. These steps can be accomplished until the interrogator 37 has received data from each of the plurality of nodes 35, at which time, the interrogator 37 can cease providing the power and interrogation signal (block 131) and/or can be repositioned, if so configured, to a different location within range of another set of health monitoring sensor nodes 35.

Figure 16:
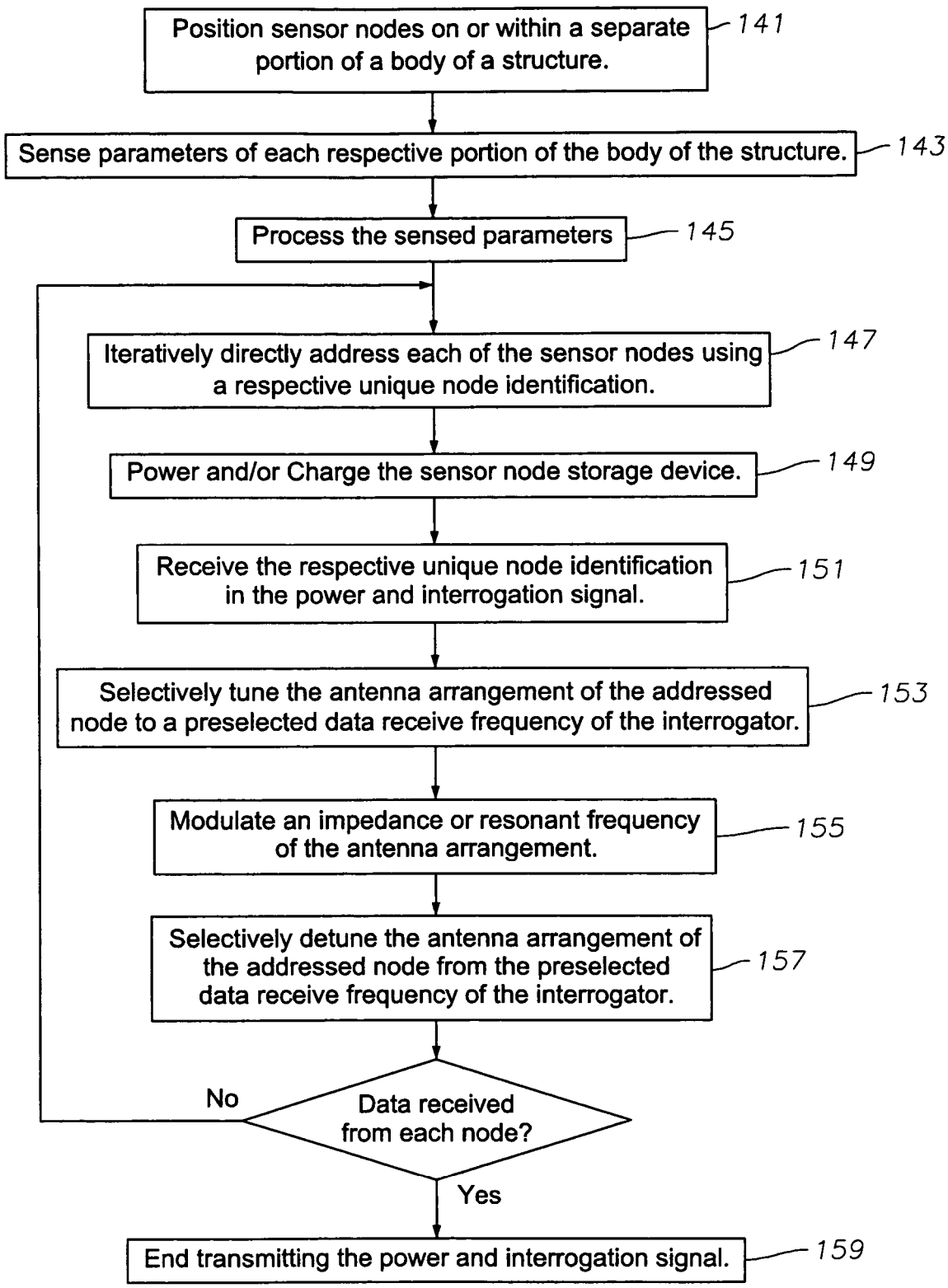
FIG. 16 is a schematic flow diagram of a method of minimizing data collisions between a plurality of structural health monitoring sensor nodes connected to a structure according to an embodiment of the present invention.

Also for example, as perhaps best shown in FIG. 16, a method of minimizing such data collisions can include the step of positioning each of a plurality of separate wireless health monitoring sensor nodes 35 on or within a portion of a body of a structure (block 141), sensing parameters of each respective portion of the body of the structure 31 (block 143) by each of the plurality of health monitoring sensor nodes 35, and processing the sensed parameters (block 145) by each of the plurality of health monitoring sensor nodes 35. The method can also include iteratively directly addressing each of the plurality of health monitoring sensor nodes 35 by the interrogator 37 using a respective unique node identification (block 147).

The method can also include the step of receiving a power and interrogation signal from an interrogator 37 by each of the health monitoring sensor nodes 35 to thereby power and/or charge each respective nodes 35 (block 149). As with some of the previously described embodiments, this signal can be a broadband frequency spectrum signal or a signal having two or more narrow band frequency spectrum ranges in order to communicate with and power both active and inactive nodes 35. The method can also include receiving the respective unique node identification in the power and interrogation signal (block 151). The method can also include selectively tuning the antenna arrangement 51 of the addressed node 35 to a preselected data receive frequency of the interrogator 37 (block 153) responsive to the power and interrogation signal to thereby enable data transfer to the interrogator 37. This step is generally performed separately for each node 35 in response to receiving the respective unique node identification in the power and interrogation signal.

The method can also include the steps of modulating an impedance or resonant frequency of the antenna arrangement 51 of each respective node 35 (block 155) to thereby provide to the interrogator 37 processed sensor data processed by each node 35, and selectively detuning the antenna arrangement 51 of the addressed node 35 from the preselected data receive frequency of the interrogator 37 (block 157) to thereby minimize data collisions with other ones of the plurality of health monitoring sensor nodes 35 further addressed by the interrogator 37. The above steps can be iteratively accomplished until the interrogator 37 has received data from each of the plurality of nodes 35, at which time, the interrogator 37 can cease providing the power and interrogation signal (block 159) or can be repositioned, if so configured, to a different location within range of another set of health monitoring sensor nodes 35.

The invention has several advantages. Embodiments of the present invention provide communication nodes 35 having a low-power, low complexity, configurable antenna arrangement 51 to enable link sharing between multiple communicating nodes 35 in a passive radiofrequency communications scheme. Advantageously, the nodes 35 can utilize a configurable antenna structure to detune the antennas of the nodes 35, allowing only a subset of nodes 35 to communicate at any given time so that collisions are minimized or eliminated, thereby enabling more nodes 35 to be placed in close proximity to each other. Advantageously, such embodiments allow for a multiple access scheme in which multiple nodes 35 that are in close proximity can communicate at an acceptable level of collision in the physical layer.

Embodiments of the present invention include a combination of health monitoring sensor nodes 35 and interrogator 37 which provides a near field passive communications scheme whereby the interrogator 37 can be providing power to a plurality of sensor nodes 35 whether or not the nodes 35 are currently communicating with the interrogator 37 (tuned) or awaiting communication with the interrogator 37 (off-tuned). Particularly, embodiments of the present invention include an interrogator 37 or reader which can utilize a broadband transmission spectrum coupled with a narrow band receive spectrum. When a node 35 is inactive its antenna can be configured to have reflection or backscattering outside the receive band of the interrogator 37. Because the interrogator 37 can have a broadband transmit frequency spectrum according to various embodiments of the present invention, radio frequency energy from the interrogator 37 can be collected by each node 35 and stored for later use, even when the node 35 is or has become inactive.

According to various embodiments, the antenna shape, and thus the operating frequency of the antenna arrangement 51 for the node 35, can be reconfigured by changing the state of the antenna coil, thus tuning the antenna arrangement 51 to at least one receive frequency of the interrogator 37. Embodiments of the present invention can utilize a switch in conjunction with a coil antenna to change the shape of the antenna. This can, for example, be accomplished by shorting a portion of the coil. According to other embodiments, a switch or voltage bias can instead change the capacitance of an LC tank circuit in which the antenna is a part in order to tune the antenna arrangement 51 to the receive frequency of the interrogator 37. Regardless, advantageously, the respective switch can be a radio frequency micro-electro-mechanical system (MEMS) switch, and/or can be a bistable switch, requiring power only to actuate, but remaining in either state without consuming any power.

According to embodiments of the present invention the switch can be controlled via a timing circuit that has a fixed delay. Advantageously, in one embodiment, different nodes 35 can utilize different delays. In another embodiment, the delay is variable and its characteristics are chosen such that no two nodes 35 that would interfere with each other will always communicate at the same time. Thus, if a collision occurs, the nodes 35 will not continue to collide indefinitely. In another embodiment, the delay is pseudorandom within a preselected delay range.

Advantageously, according to embodiments of the present invention, the interrogator 37 can transmit a node identification. The addressed node 35 can then change the state of its switch from active to inactive to transmit its data. Further, the state of the switch can be changed back either autonomously, or through another command received from the interrogator 37. Advantageously, use of a unique identification for each sensor node 35 allows for both individual querying of a specific sensor node 35 and broadcasting a request to a plurality of nodes 35 to respond thereto. That is, to reduce complexity, rather than query each individual sensor node 35 using the node identification, the interrogator 37 can query the plurality of sensor nodes 35 simultaneously by transmitting a broadband signal to all sensor nodes 35, simultaneously. Each node 35 can then provide its respective identification to identify which node 35 is sending data.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, generally the illustrated embodiments describe tuning the antenna arrangement 51 from an offset resonant frequency to the data acquisition operating frequency of the interrogator 37. Adjusting the antenna arrangement 51 away from such data acquisition operating frequency, by default, is equally within the scope of the present invention. Also for example, rather than receive a power signal on the same antenna used to provide data to an interrogator 37, a second antenna can be used to separately harvest power from the interrogator 37.

This invention is related to Non-Provisional application Ser. No. 11/287,009 by Berkcan, et al., titled "System to Monitor the Health of a Structure, Sensor Nodes, Program Product, and Related Methods," filed on Nov. 23, 2005; and Non-Provisional Application No. 11/286,795, by Andarawis, et al., titled "System to Monitor the Health of a Structure, Sensor Nodes, Program Product, and Related Methods," filed on Nov. 23, 2005, all incorporated by reference herein in their entirety.

The invention claimed is:

1. A passive communication health monitoring sensor node connected to or embedded within a body of a structure to monitor data related to parameters of a portion of the body of the structure, the node comprising:
 a processor;
 a sensor element coupled to the processor and adapted to sense parameters of a portion of a body of the structure to be monitored to define sensed parameters;
 an antenna arrangement including an antenna and coupled to the processor to receive interrogation signals and having at least one tuned and a detuned state;
 a memory coupled to the processor to store operating instructions therein; and
 a parameter processing program product stored in the memory and including instructions that when executed by the processor perform the operations of processing the sensed parameters to define processed sensor data, selectively tuning the antenna arrangement to at least one preselected data receive frequency of a health monitoring sensor node interrogator responsive to receiving a power and interrogation signal from the interrogator to thereby enable data transfer to the interrogator, providing the processed sensor data to the interrogator, and selectively detuning the antenna arrangement from the preselected data receive frequency of the interrogator.

2. The node as defined in claim 1,
 wherein the node includes an antenna arrangement tuner in communication with the processor and positioned to tune the antenna arrangement to the at least one preselected data receive frequency of the interrogator; and
 wherein the parameter processing program product further includes instructions to perform the operations of enabling the antenna arrangement tuner to change the inductance of the antenna to thereby tune the antenna arrangement responsive to passage of a delay period after receiving the power and interrogation signal.

3. The node as defined in claim 2,
 wherein the parameter processing program product further includes instructions to perform the operations of iteratively tuning to enable data transfer and detuning the antenna arrangement to define a data transmission cycle responsive to receiving the power and interrogation signal; and
 wherein the delay period resets to a different delay period after each data transmission cycle.

4. The node as defined in claim 3, wherein the delay period is pseudorandom within a preselected range.

5. The node as defined in claim 2,
 wherein the node further includes a capacitive arrangement having a variable capacitance; and
 wherein the antenna arrangement tuner is positioned to change the capacitance of the capacitive arrangement to thereby tune the antenna arrangement.

6. The node as defined in claim 1,
 wherein the memory includes a node identification;
 wherein the node is directly addressable by the interrogator using a node identification; and
 wherein the node includes an antenna arrangement tuner in communication with the processor and positioned to tune the antenna arrangement to the at least one preselected data receive frequency of the interrogator responsive to receiving the node identification in the power and interrogation signal.

7. The node as defined in claim 1,
 wherein the node includes an antenna arrangement tuner in communication with the processor and positioned to tune the antenna arrangement to the at least one preselected data receive frequency of the interrogator; and
 wherein the antenna arrangement tuner is positioned to provide a substantially short circuit condition to a portion of the antenna to thereby tune or to detune the antenna arrangement.

8. The node as defined in claim 1, wherein each node includes a bistable switch positioned to vary the antenna arrangement between tuned and detuned states, the bistable switch requiring power to actuate and substantially not requiring power when stabilized.

9. The node as defined in claim 1, wherein the at least one tuned state is a plurality of detuned states, wherein the antenna includes a plurality of antenna taps, and wherein each node includes a multistable switch operatively connected to the plurality of antenna taps and positioned to vary the antenna arrangement between the plurality of tuned states and the detuned state, the multistable switch requiring power to actuate and substantially not requiring power when stabilized.

10. A system to monitor the health of a structure, the system comprising:
 a structure to be monitored having a body;
 a plurality of separate health monitoring sensor nodes each connected to or embedded within the body of the structure to monitor data related to parameters of a respective portion of the body of the structure, each node having a processor, a sensor element coupled to the processor and positioned to sense parameters of the respective portion of the body of the structure to define sensed parameters, an antenna arrangement including an antenna and coupled to the processor to receive interrogation signals and having an active tuned state and an inactive detuned state, a power harvester coupled to the processor and the antenna arrangement to harvest power received therefrom, a power storage device to store harvested power, and a memory coupled to the processor to store operating instructions and data therein;
 a plurality of health monitoring sensor node interrogators each having an antenna arrangement and positioned to transmit a request for data to a subset of the plurality of health monitoring sensor nodes and to receive requested data therefrom and having a preselected power and interrogation signal transmission frequency spectrum and a preselected data signal receive frequency spectrum having a preselected data receive frequency substantially coinciding with the active tuned state of the respective subset of the plurality of health monitoring sensor nodes; and a parameter processing program product separately stored in the memory of each of the plurality of health monitoring sensor nodes and including instructions that when executed by the respective processor perform the operations of processing the sensed parameters to define processed sensor data, selectively tuning the antenna arrangement to the preselected data receive frequency of at least one of the plurality of interrogators responsive to receiving a power and interrogation signal from the interrogator to thereby enable data transfer to the respective interrogator via passive radiofrequency communication, providing the processed sensor data to the respective interrogator, and selectively detuning the antenna arrangement from the preselected data receive frequency of the respective interrogator to thereby minimize data collisions with other ones of the plurality of health monitoring sensor nodes.

11. The system as defined in claim 10, wherein each node includes an antenna arrangement tuner positioned to tune the respective antenna arrangement to the preselected data receive frequency of at least one of the plurality of interrogators responsive to passage of a delay period after receiving the power and interrogation signal.

12. The system as defined in claim 11, wherein each node has a different delay period to thereby minimize the data collisions.

13. The system as defined in claim 11,
wherein the parameter processing program product further includes instructions to perform the operations of iteratively tuning and detuning the antenna arrangement of the respective node to define a data transmission cycle responsive to receiving the power and interrogation signal, the tuning performed to enable data transfer, the detuning performed to reduce saturation of the respective preselected data receive frequency of each of the plurality of interrogators; and
wherein the delay period resets to a different delay period after each data transmission cycle to thereby minimize the data collisions.

14. The system as defined in claim 13, wherein the delay period is pseudorandom within a preselected range.

15. The system as defined in claim 10,
wherein the memory of each of the plurality of nodes includes a unique node identification;
wherein each of the plurality of nodes is directly addressable by at least one of the plurality of interrogators using the respective node identification; and
wherein each of the plurality of nodes includes a switch arrangement in communication with the respective processor and positioned to tune the antenna arrangement to the preselected data receive frequency of the at least one of the plurality of interrogators responsive to receiving the node identification in the power and interrogation signal.

16. The system as defined in claim 10,
wherein each of the plurality of nodes includes an antenna arrangement tuner in communication with the respective processor and positioned to tune the respective antenna arrangement to and detune the respective antenna arrangement from the preselected data receive frequency of at least one of the plurality of interrogators; and
wherein the antenna arrangement tuner is positioned to provide a substantially short circuit condition to a portion of the respective antenna to thereby tune or to detune the antenna.

17. The system as defined in claim 10,
wherein each of the plurality of nodes includes an antenna arrangement tuner in communication with the respective processor and positioned to tune the respective antenna arrangement to and to detune the respective antenna arrangement from the preselected data receive frequency of at least one of the plurality of interrogators; and
wherein the antenna arrangement tuner of at least one of the plurality of health monitoring sensor nodes is positioned to change a radiation pattern of a data signal provided to the at least one of the plurality of interrogators.

18. The system as defined in claim 17,
wherein the antenna of at least one of the plurality of health monitoring sensor nodes includes a plurality of segments each having a polarity; and
wherein the antenna arrangement tuner is adapted to change the polarity of one of the plurality of segments to thereby change the radiation pattern of the data signal.

19. The system as defined in claim 17,
wherein the antenna of at least one of the plurality of health monitoring sensor nodes includes a plurality of segments; and
wherein the antenna arrangement tuner is adapted to change the phase or amplitude of the data signal to thereby change the radiation pattern of the data signal.

20. A method of monitoring the health of a structure, the method comprising the steps of:
positioning each of a plurality of separate wireless health monitoring sensor nodes on or within a portion of a body of a structure, each node including an antenna arrangement having an active tuned state and an inactive detuned state;
receiving a power and interrogation signal from an interrogator by each of the plurality of health monitoring sensor nodes to thereby power each respective node;
selectively tuning the antenna arrangement of each node to a preselected data receive frequency of the interrogator responsive to the power and interrogation signal to thereby enable data transfer to the interrogator; and
selectively detuning the antenna arrangement of the each respective node from the preselected data receive frequency of the interrogator to thereby minimize data collisions with other ones of the plurality of health monitoring sensor nodes.

21. The method as defined in claim 20, the method further comprising the step of modulating an impedance of the antenna arrangement of each respective node to thereby provide to the interrogator processed sensor data processed by each node.

22. The method as defined in claim 20, the method further comprising the step of modulating a resonant frequency of the antenna arrangement of each respective node to thereby provide to the interrogator processed sensor data processed by each node.

23. The method as defined in claim 20, wherein the step of selectively tuning the antenna arrangement of each node further includes the step of delaying for a delay period tuning the respective antenna arrangement to the preselected data receive frequency of the interrogator responsive to at least one of the following: receiving the power and interrogation signal and detuning the antenna arrangement.

24. The method as defined in claim 23, wherein each node has a different delay period to thereby minimize the data collisions.

25. The method as defined in claim 23,
wherein the steps of selectively tuning the antenna arrangement of each node, and selectively detuning the antenna arrangement of each node includes iteratively tuning and detuning the antenna arrangement of the respective node to define a data transmission cycle responsive to receiving the power and interrogation signal, the tuning performed to enable data transfer, the detuning performed to reduce saturation of the preselected data receive frequency of the interrogator.

26. The method as defined in claim 25,
wherein the method further includes the step of resetting the delay period to a different delay period after each data transmission cycle so that no two nodes of the plurality of nodes continuously have the same delay period to thereby minimize the data collisions.

27. The method as defined in claim 26, wherein the delay period is pseudorandom within a preselected range.

28. The method as defined in claim 20,
wherein the method further includes the step of directly addressing each of the plurality of health monitoring sensor nodes by the interrogator using a respective unique node identification; and
wherein the step of selectively tuning the antenna arrangement of each node to a preselected data receive frequency of the interrogator includes performing such step individually for each node responsive to receiving the respective unique node identification in the power and interrogation signal.

29. The method as defined in claim 20, the method further comprising the step of forming a substantially short circuit condition to a portion of the antenna of at least one of the plurality of health monitoring sensor nodes to thereby tune the respective antenna arrangement to or to detune the respective antenna arrangement from the preselected data receive frequency of the interrogator.

30. The method as defined in claim 20, the method further comprising the step of varying capacitance of the antenna arrangement of at least one of the plurality of health monitoring sensor nodes to thereby tune the respective antenna arrangement to or to detune the respective antenna arrangement from the preselected data receive frequency of the interrogator.

31. The method as defined in claim 20, the method further comprising the step of varying a radiation vector of the antenna arrangement of at least one of the plurality of health monitoring sensor nodes to thereby tune the respective antenna arrangement to or to detune the respective antenna arrangement from the preselected data receive frequency of the interrogator.

* * * * *